US009041758B2

(12) United States Patent
Kaima

(10) Patent No.: US 9,041,758 B2
(45) Date of Patent: May 26, 2015

(54) OPTICAL SCANNING DEVICE, OPTICAL SCANNING DEVICE CONTROL METHOD, AND IMAGE FORMING APPARATUS

(71) Applicant: Nobuyoshi Kaima, Tokyo (JP)

(72) Inventor: Nobuyoshi Kaima, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 13/947,640

(22) Filed: Jul. 22, 2013

(65) Prior Publication Data
US 2014/0036021 A1 Feb. 6, 2014

(30) Foreign Application Priority Data

Jul. 31, 2012 (JP) .................................. 2012-170255
Jun. 24, 2013 (JP) .................................. 2013-132122

(51) Int. Cl.
*B41J 2/435* (2006.01)
*B41J 2/47* (2006.01)
*G02B 26/10* (2006.01)
*G02B 26/12* (2006.01)
*G06K 15/12* (2006.01)

(52) U.S. Cl.
CPC .............. *G02B 26/10* (2013.01); *G02B 26/123* (2013.01); *G06K 15/1261* (2013.01)

(58) Field of Classification Search
CPC ................. B41J 2/45; B41J 2/47; B41J 2/471; G02B 2006/0098
USPC ......... 347/230, 231, 236–238, 241, 243, 246, 347/247, 253, 256, 258–261
See application file for complete search history.

(56) References Cited

U.S. PATENT DOCUMENTS

| 5,140,349 | A * | 8/1992 | Abe et al. ........................ 347/129 |
| 7,612,928 | B2 * | 11/2009 | Tomita ......................... 359/204.1 |
| 8,064,094 | B2 * | 11/2011 | Kaima et al. ..................... 358/1.2 |
| 8,384,752 | B2 | 2/2013 | Tomita |
| 2007/0122210 | A1 | 5/2007 | Sato et al. |
| 2007/0140721 | A1 | 6/2007 | Shinohara et al. |
| 2009/0066981 | A1 | 3/2009 | Kaima et al. |
| 2010/0231940 | A1 | 9/2010 | Kaima |
| 2011/0222085 | A1 | 9/2011 | Takesue et al. |

FOREIGN PATENT DOCUMENTS

| JP | 02066584 A * | 3/1990 | ............. G03G 15/04 |
| JP | 2007-293202 | 11/2007 | |
| JP | 2008-233151 | 10/2008 | |

* cited by examiner

*Primary Examiner* — Hai C Pham
(74) *Attorney, Agent, or Firm* — Oblon, McClelland, Maier & Neustadt, L.L.P.

(57) ABSTRACT

An optical scanning device includes: a driving unit that drives a light source that outputs multiple light beams; a deflecting unit that scans a scanning surface in a main-scanning direction by deflecting the light beams, the scanning surface moving at a predetermined line speed in a sub-scanning direction; and a control unit that changes number of the light beams according to the line speed by controlling the driving unit, changes a scanning speed of the deflecting unit in the main-scanning direction according to a difference between an exposure amount per unit length in the main-scanning direction after a change in the number of the light beams and a predetermined exposure amount, and changes light intensity of each of the light beams output by the light source according to an amount of a change in the scanning speed.

20 Claims, 20 Drawing Sheets

FIG.3
(a)
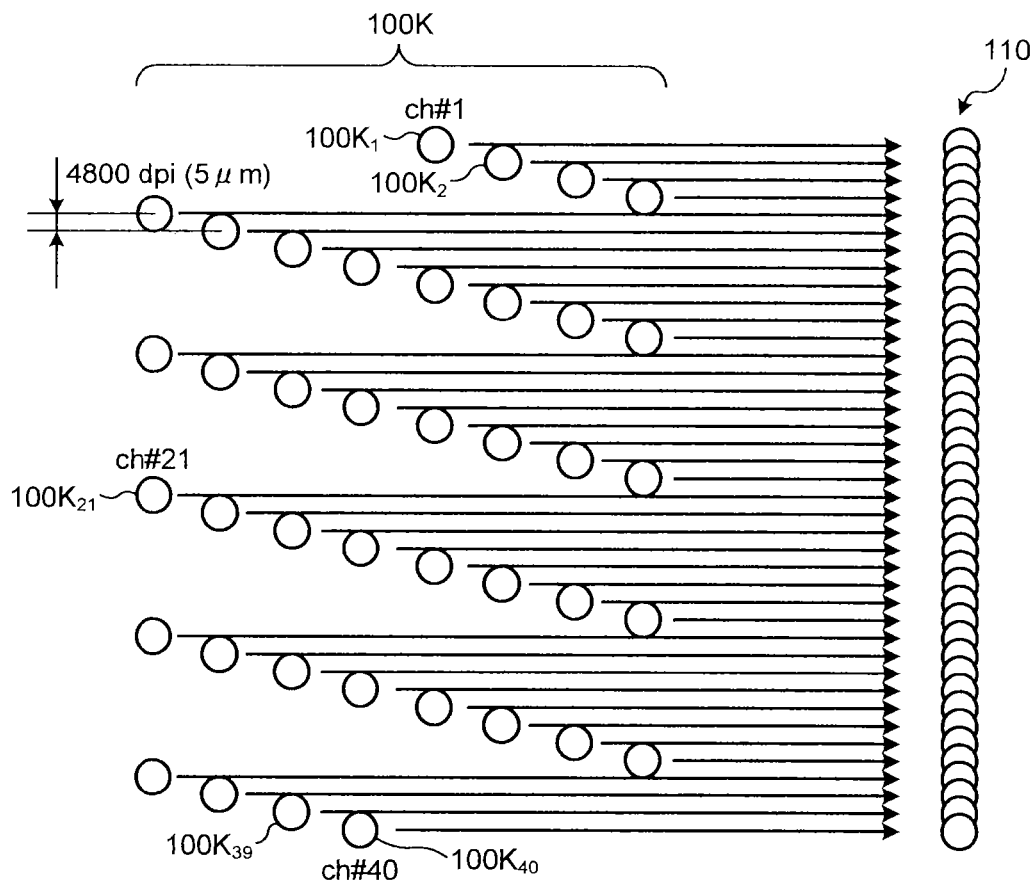
(b)
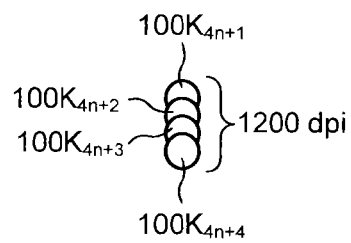

FIG.15

|  | LINE SPEED 100% (360 mm/s) | LINE SPEED 90% (324 mm/s) | LINE SPEED 82% (295.2 mm/s) |
|---|---|---|---|
| NUMBER OF BEAMS | 40 | 36 | 32 |
| ROTATION FREQUENCY OF POLYGON (SIX-SIDED) | 17007.87 rpm | 17007.87 rpm | 17433.07 rpm |
| LIGHT INTENSITY | 0.200 mW | 0.200 mW | 0.205 mW |
| WRITE CLK FREQUENCY | 40 MHz | 40 MHz | 41.0 MHz |

FIG.16
(a)
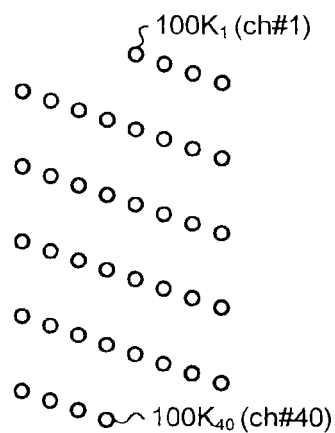
(b)
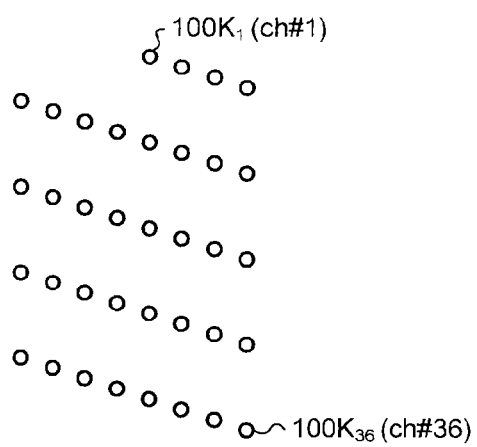
(c)
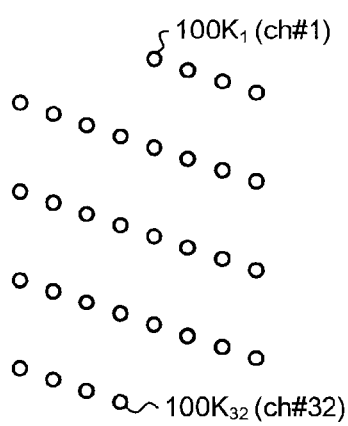

FIG.21
(a)
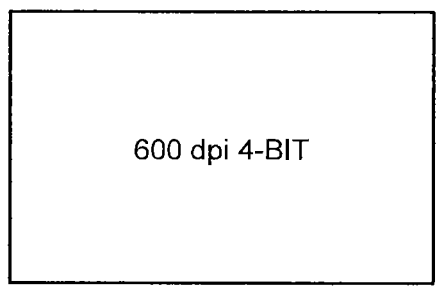
ODD/EVE=1
→ ch#1
→ ch#2
→ ch#3
→ ch#4
→ ch#5
→ ch#6
→ ch#7
→ ch#8
(b)
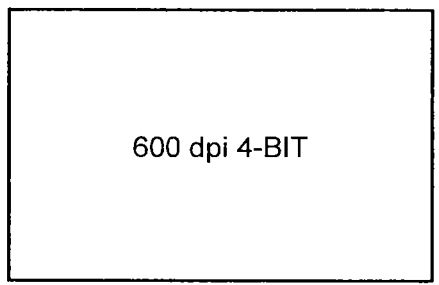
ODD/EVE=0
→ ch#5
→ ch#6
→ ch#7
→ ch#8
→ ch#9
→ ch#10
→ ch#11
→ ch#12

OPTICAL SCANNING DEVICE, OPTICAL SCANNING DEVICE CONTROL METHOD, AND IMAGE FORMING APPARATUS

CROSS-REFERENCE TO RELATED APPLICATIONS

The present application claims priority to and incorporates by reference the entire contents of Japanese Patent Application No. 2012-170255 filed in Japan on Jul. 31, 2012 and Japanese Patent Application No. 2013-132122 filed in Japan on Jun. 24, 2013.

BACKGROUND OF THE INVENTION

1. Field of the Invention

The present invention relates to an optical scanning device that scans a scanning surface with a light beam, an optical scanning device control method, and an image forming apparatus.

2. Description of the Related Art

In an electrophotographic image forming apparatus, there is known a technology for forming an image on a printing medium such that an electrostatic latent image based on image data is formed by exposing a photosensitive drum on which static charges are formed, the electrostatic latent image is developed by a developer to form a toner image, and the toner image is heated by a fixing roller so as to be fixed to the printing medium.

In such an image forming apparatus, there is known a technology for exposing the photosensitive drum on which the static charges are formed, by scanning the photosensitive drum in the main-scanning direction with a light beam while deflecting the light beam by a polygon mirror rotating at a constant speed.

Meanwhile, a single image forming apparatus may be provided with multiple process line speed modes. For example, different process line speeds may be set in image forming apparatuses of the same model when the image forming apparatuses are shipped.

For another example, it may be desired to set the process line speed in accordance with a parameter of image formation in a single image forming apparatus. As an example in this case, a single image forming apparatus may form images on printing media with different thicknesses. In this case, the image forming apparatus needs to apply more heat for fixing a toner image to a thicker printing medium. The heat to be applied is controlled by setting the process line speed, that is, a printing-medium conveying speed, in accordance with the thickness of the printing medium.

If the process line speed is changed, it is necessary to also change the scanning speed of the light beam in order to maintain the constant exposure amount per unit length in the main-scanning direction on the photosensitive drum. If the image forming apparatus uses a polygon mirror to perform scanning with the light beam, the scanning speed of the light beam can be changed by changing the rotation speed (the rotation frequency per unit time) of the polygon mirror.

If the scanning speed of the light beam Ls changed in the image forming apparatus, scanning time with the light beam per unit length changes and thus the exposure amount per unit length on the photosensitive drum changes. Therefore, to allow the image forming apparatus to achieve the same exposure of the photosensitive drum, it is necessary to change the exposure amount by controlling the light intensity of the light beam according to the amount of change in the scanning speed.

Incidentally, in recent years, to realize a high-speed and high-resolution apparatus, a laser diode array (LDA) that can simultaneously emit multiple (two to four) beams and a surface-emitting laser referred to as a vertical cavity surface emitting laser (VCSEL) that can simultaneously emit about 40 light beams have been developed. Besides, an image forming apparatus, which employs the LDA or the VCSEL as a light source of light beams to expose a photosensitive element and which can form images with higher definition and higher speed, has been put to practical use.

In the exposing optical system using multiple beams an described above, there is known a technology, in which when the process line speed is changed, the number of beams to be used is changed according to the process line speed in order to change the exposure amount without changing the light emission power of the laser.

Japanese Patent Application Laid-open No. 2007-293202 discloses a technology, in which when the process line speed is changed, the rotation frequency of a rotary deflector and the number of light sources are controlled based on a ratio of the process line speed before the change to the process line speed after the change. According to Japanese Patent Application Laid-open No. 2007-293202, it is possible to maintain the rotation frequency of the rotary deflector in the optimal range of the rotation frequency when the process line speed is changed.

Some laser light sources have an upper limit and a lower limit on the available light emission power. In case, there is a problem in that, in the conventional technology, when the rotation speed of the polygon mirror is changed and the light intensity of the light beam is controlled when the process line speed is changed, it may be impossible to achieve the change of the light emission power corresponding to the change in the process line speed. This becomes a big problem particularly when the amount of change in the process line speed is large.

Furthermore, in the exposing optical system using multiple beams, if corrective action is taken by changing the number of beams to be used according to the change in the process line speed, available process line speeds have to depend on the change ratio of the number of beams. Therefore, there is a problem in that it becomes difficult to select the optimal process line speed.

Moreover, even Japanese Patent Application Laid-open No. 2007-293202 does not disclose control such that exposure is performed with the light intensity of the laser light source within the available range and at the optimal process line speed.

Therefore, there is a need to make it possible to appropriately expose the photosensitive drum according to the process line speed.

SUMMARY OF THE INVENTION

It is an object of the present invention to at least partially solve the problems in the conventional technology.

An optical scanning device includes: a driving unit that drives a light source that outputs multiple light beams; a deflecting unit that scans a scanning surface in a main-scanning direction by deflecting the light beams, the scanning surface moving at a predetermined line speed in a sub-scanning direction; and a control unit that changes number of the light beams according to the line speed by controlling the driving unit, changes a scanning speed of the deflecting unit in the main-scanning direction according to a difference between an exposure amount per unit length in the main-scanning direction after a change in the number of the light beams and a predetermined exposure amount, and changes light intensity of each of the light beams output by the light source according to an amount of a change in the scanning speed.

An optical scanning device control method includes: driving a light source that outputs multiple light beams; scanning a scanning surface in a main-scanning direction by deflecting the light beams, the scanning surface moving at a predetermined line speed in a sub-scanning direction; controlling including changing number of the light beams according to the line speed by controlling the driving of the light source, changing a scanning speed by the deflecting in the main-scanning direction according to a difference between an exposure amount per unit length in the main-scanning direction after a change in the number of the light beams and a predetermined exposure amount, and changing light intensity of each of the light beams output by the light source according to an amount of the change in the scanning speed.

An image forming apparatus includes: a light source that simultaneously outputs multiple light beams; a driving unit that drives the light source; a deflecting unit that deflects the light beams; a photosensitive drum that rotates about a rotation axis at a predetermined line speed in a sub-scanning direction and that is scanned and exposed in a main-scanning direction with the light beams deflected by the deflecting unit; a control unit that changes number of the light beams according to the line speed by controlling the driving unit, changes a scanning speed of the deflecting unit in the main-scanning direction according to a difference between an exposure amount per unit length in the main-scanning direction after a change in the number of the light beams and a predetermined exposure amount, and changes light intensity of each of the light beams output by the light source according to a change in the scanning speed; and an image forming unit that forms an image by the photosensitive drum.

An image forming apparatus includes: a light source that simultaneously outputs multiple light beams; a driving unit that drives the light source; a deflecting unit that deflects the light beams; a photosensitive drum that rotates about a rotation axis at a predetermined line speed in a sub-scanning direction and that is scanned and exposed in a main-scanning direction with the light beams deflected by the deflecting unit; a control unit that changes number of the light beams according to the line speed by controlling the driving unit, changes a scanning speed of the deflecting unit in the main-scanning direction according to a difference between an exposure amount per unit length in the main-scanning direction after a change in the number of the light beams and a predetermined exposure amount, and changes light intensity of each of the light beams output by the light source according to a change in the scanning speed; and an image forming unit that forms an image by the photosensitive drum.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A and 3B are diagrams illustrating an array of laser elements for outputting laser beams in a VCSEL applicable to the embodiment;

FIG. 15 is a diagram illustrating an example of specifications for controlling write at each line speed according to the embodiment;

FIGS. 16A to 16C are diagrams illustrating examples of laser elements used in the VCSEL at a first line speed, a second line speed, and a third line speed according to the embodiment;

FIGS. 21A and 21B are diagrams illustrating an example of the operation performed by the density converting unit according to the embodiment.

DETAILED DESCRIPTION OF THE PREFERRED EMBODIMENTS

An embodiment of the present invention will be explained in detail below with reference to the accompanying drawings.

Configuration Applicable to the Embodiment

Figure 1:
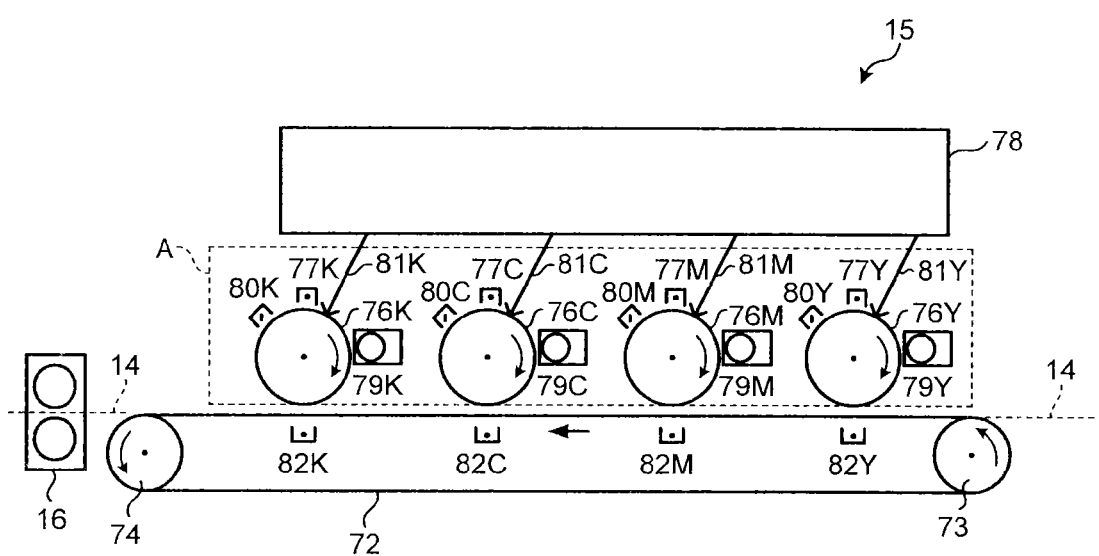
FIG. 1 is a diagram illustrating a configuration example of a transfer unit included in an image forming apparatus applicable to an embodiment.

FIG. 1 illustrates a configuration example of a transfer unit 15 included in an image forming apparatus applicable to the embodiment. The transfer unit 15 is a tandem-type color image forming unit that can form a color image by using colors of yellow (Y), magenta (M), cyan (C), and black (K).

In the transfer unit 15, an image forming unit A for forming images of a plurality of colors of yellow (Y), magenta (M), cyan (C), and black (K) is arranged in a line along a conveying belt 72 that conveys a sheet of paper. The conveying belt 72 is extended between conveying rollers 73 and 74, one of which serves as a driving roller that drivingly rotates and the other of which serves as a driven roller that is driven to rotate. The conveying belt 72 is driven to rotate in a direction of an arrow in FIG. 1 by the rotation of the conveying rollers 73 and 74.

In the image forming apparatus, a sheet of paper taken from a sheet feed unit (not illustrated) is fed to the transfer unit 15 via a conveying path 14, delivered to the conveying belt 72, and attracted on the conveying belt 72 by electrostatic attraction.

The attracted sheet of paper is conveyed to a first image forming unit for forming a yellow image, and a yellow image is formed on the sheet at here. The first image forming unit includes a photosensitive drum (photoreceptor) 76Y, and also includes a charging unit 77Y, an exposing unit 78, a developing unit 79Y, and a photoreceptor cleaner 80Y that are arranged around the photosensitive drum 76Y. The charging unit 77Y uniformly charges the surface of the photosensitive drum 76Y and the exposing unit 78 subsequently exposes the surface with a scanning beam 81Y that is a light beam corresponding to the yellow image, so that an electrostatic latent image is formed.

In the embodiment, the scanning beam 81Y includes a plurality of laser beams. Examples of a light-emitting element that can simultaneously output multiple laser beams include a laser diode array, in which a plurality laser diodes are arrayed, and a vertical cavity surface emitting laser (VCSEL), which emits light perpendicular to its surface. In the following, a VCSEL is explained as the light-emitting element that outputs light beams. The VCSEL explained herein is a 40-channel VCSEL that can output 40 laser beams.

The electrostatic latent image is formed by laser beam writing of a main-/sub-scanning system, in which scanning with beams from the exposing unit 78 serves as main-scanning and rotation of the photosensitive drum perpendicular to the main-scanning serves as sub-scanning so that a two-dimensional image can be written on the surface of the photosensitive drum with the laser beams.

The developing unit 79Y develops the electrostatic latent image formed on the surface of the photosensitive drum 76Y, so that a toner image is formed on the photosensitive drum 76Y. A transfer unit 82Y transfers the toner image at a position (transfer position) where the photosensitive drum 76Y and the sheet of paper on the conveying belt 72 come into contact with each other, so that a single color image of yellow is formed on the sheet of paper. The photoreceptor cleaner 80Y cleans waste toner remaining on the surface of the photosensitive drum 76Y after completion of the transfer, so that preparation for next image formation is ready.

The sheet of paper on which the single color image of yellow is transferred by the first image forming unit as described above is conveyed to a second image forming unit by the conveying belt 72 to form a magenta image. Similarly to the first image forming unit as described above, a magenta toner image is formed on a photosensitive drum 76M, and transferred to the sheet of paper so that the magenta image is superimposed on the previously-formed yellow image. The sheet of paper is further conveyed to a third image forming unit for forming a cyan image and to a fourth image forming unit for forming a black image, so that a cyan toner image and a black toner image formed in a manner similar to the yellow toner image and the magenta toner image are superimposed on the previously-formed images. When the transfer of all of the colors YMCK is complete, a color image is formed.

The sheet of paper on which the color image is formed by passing through the fourth image forming unit is separated from the conveying belt 72, subjected to image fixation by a fixing unit 16, and discharged.

Figure 2:
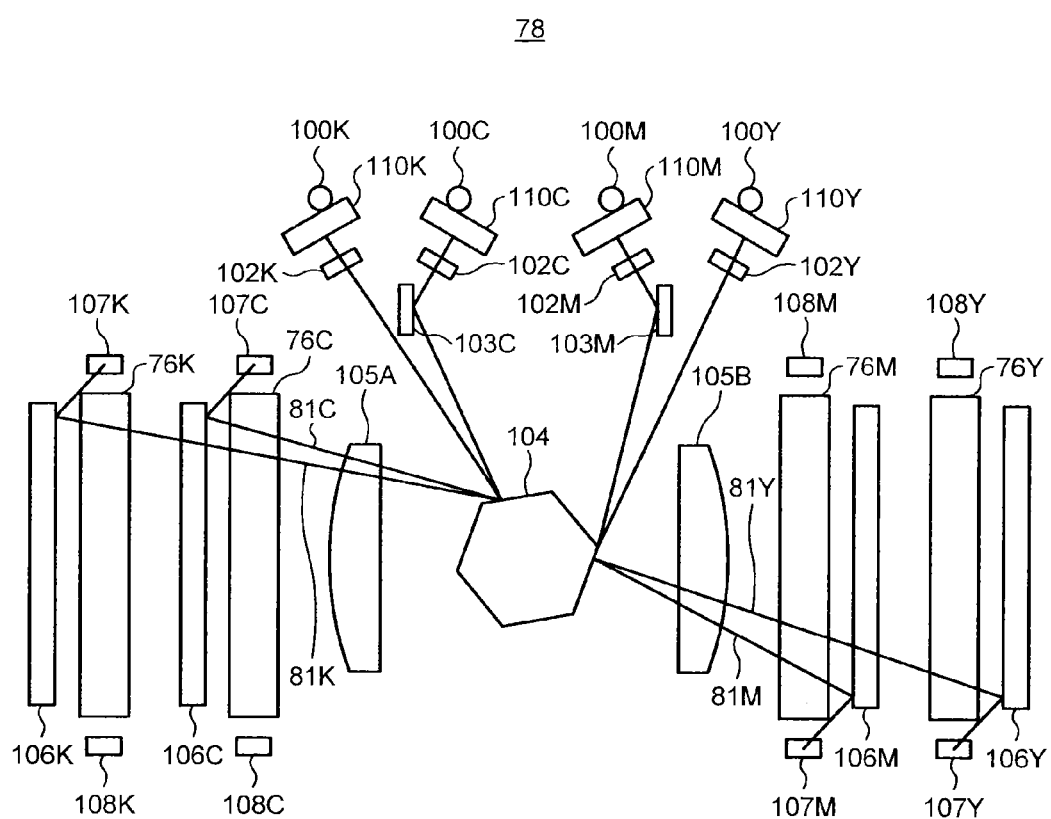
FIG. 2 is a diagram illustrating a configuration example of an optical device included in an exposing unit applicable to the embodiment.

FIG. 2 illustrates a configuration example of an optical device included in the exposing unit 78. In this example, light beams output by each of VCSELs 100Y, 100M, 100C, and 100K for a corresponding color are deflected by a single six-sided polygon mirror 104 that rotates at a constant speed, so that scanning beams 81Y, 81M, 81C, and 81K for the respective colors are obtained.

The configuration of the optical device illustrated in FIG. 2 will be explained in detail below. Each of the VCSELs 100Y, 100M, 100C, and 100K mounted on laser diode (LD) driver ports 110Y, 110M, 110C, and 110K for the respective colors Y, M, C, and K outputs a laser beam bundle of a plurality of laser beams.

The laser beam bundle output by the VCSEL 100K for example will be explained below. A collimator lens 102K collimates the laser beam bundle into a parallel beam. The laser beam bundle output from the collimator lens 102K is reflected and deflected by the polygon mirror 104 being rotated. The laser beam bundle output from the polygon mirror 104 is corrected by an fθ lens 105A such that dots can uniformly be formed in the main-scanning direction on a photosensitive drum 76K, so that the scanning beam 81K is obtained.

The scanning beam 81K is reflected by a reflecting mirror 106K and applied to the photosensitive drum 76K. The photosensitive drum 76K rotates about a rotation axis at a speed corresponding to a process line speed of the image forming apparatus. For example, by causing the polygon mirror 104 to rotate counterclockwise in FIG. 2, the surface of the photosensitive drum 76K is scanned with the scanning beam 81K in the main-scanning direction.

A front-end synchronous detection sensor 107K and a rear-end synchronous detection sensor 108K, each of which outputs a detection signal upon reception of the scanning beam 81K, are arranged on both sides of the photosensitive drum 76K. With the detection signals output by the front-end synchronous detection sensor 107K and the rear-end synchronous detection sensor 108K, it is possible to detect a start timing and an end timing of scanning with the scanning beam 81K in the main-scanning direction.

Incidentally, front-end synchronous detection sensors 107C, 107M, and 107Y and rear-end synchronous detection sensors 108C, 108M, and 108Y are provided at both ends of the photosensitive drums 76C, 76M, and 76Y, respectively.

The above configuration is applied to the other colors Y, M, and C in a substantially similar manner. Specifically, in the case of the color C, a laser beam bundle output by the VCSEL 100C is collimated into a parallel beam by a collimator lens 102C, reflected by a mirror 103C at a predetermined angle, and applied to the polygon mirror 104. The laser beam bundle for the color C deflected by the polygon mirror 104 is changed into the scanning beam 81C through the fθ lens 105A, reflected by a reflecting mirror 106C, and applied to the photosensitive drum 76C.

In the case of the colors M and Y, laser beam bundles output by the VCSELs 100M and 100Y are collimated by collimator lenses 102M and 102Y, respectively. The laser beam bundle for the color M is further reflected by a mirror 103M at a predetermined angle. Then, the laser beam bundles are applied to the polygon mirror 104. The laser beam bundles deflected by the polygon mirror 101 are changed into the scanning beams 81M and 81Y through the fθ lens 105B, reflected by reflecting mirrors 106M and 106Y, and applied to the photosensitive drums 76M and 76Y, respectively.

FIGS. 3A and 3B illustrate examples of an array of laser elements $100K_1$, $100K_2$, ..., $100K_{21}$, ..., $100K_{39}$, and $100K_{40}$ that output laser beams in the VCSEL 100K. In FIG. 3, the vertical direction indicates a sub-scanning direction.

As illustrated in FIG. 3A, the 40 laser elements TOCK to $100K_{40}$ are arrayed so that the resolution in the sub-scanning direction is 4800 dpi (dot per inch). Namely, the writing resolution of the VCSEL 100K is 4800 dpi. At this time, the space between the laser elements $100K_1$ to $100K_{40}$ in the sub-scanning direction becomes about 5 µm.

In addition, the laser elements $100K_1$ to $100K_{10}$ are arranged so as to be sequentially shifted at predetermined intervals in the main-scanning direction. Therefore, to apply laser beams emitted by the laser elements $100K_1$ to $100K_{40}$ to the photosensitive drum 76K while performing scanning in the main-scanning direction so that the applied positions align in the sub-scanning direction, it necessary to control the output timing of the laser beams from each of the laser elements $100K_1$ to $100K_{40}$ in a predetermined way. The control of the output timing of the laser beams will be explained later.

In the embodiment, an image with the resolution of 1200 dpi can be formed based on image data subjected to image processing in units of 1200 dpi by causing light emission in units of four laser elements $100K_{4n+1}$, $100K_{4n+2}$, $100K_{4n+3}$, and $100K_{4n+4}$ (n is an integer equal. to or greater than zero) as illustrated in FIG. 3B.

Figure 4:
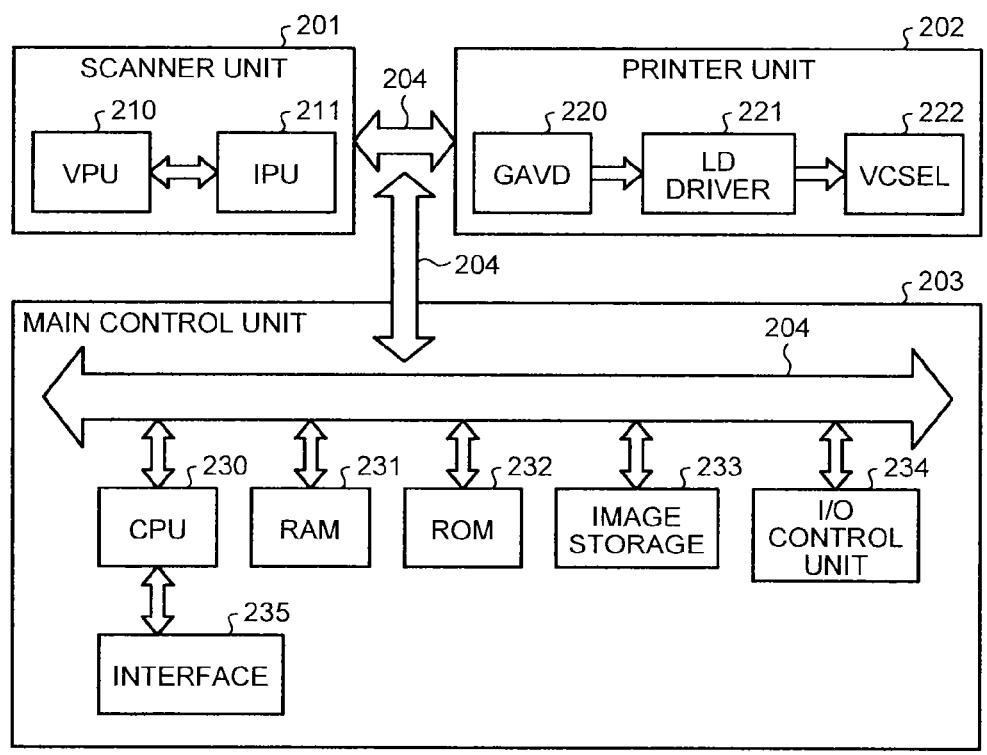
FIG. 4 is a block diagram illustrating a configuration example of a controller unit that controls the image forming apparatus applicable to the embodiment.

FIG. 4 illustrates a configuration example of a controller unit 200 that controls the image forming apparatus applicable to the embodiment. In this example, the controller unit 200 includes a scanner unit 201, a printer unit 202, and a main control unit 203, all of which are communicably connected to one another via a system bus 204. In the image forming apparatus according to the embodiment, the main control unit 203 can process image data of a document read by the scanner unit 201 and the printer unit 202 can print the image data.

The scanner unit 201 includes a visual processing unit (VPU) 210 and an image processing unit (IPU) 211. The scanner unit 201 performs predetermined processing on image data read by an image reading unit using a charge coupled device (CCD) or the like, and outputs the processed image data. More specifically, the VPU 210 performs analog-to-digital (A/D) conversion on an image signal, which is an analog signal output based on an original image read by the image reading unit, to obtain image data, and performs black offset correction, shading correction, or pixel position correction on the image data. The IPU 211 performs a process for converting the image data in the RGB color space subjected to the image processing by the VPU 210 into image data in the CMYK color space that is compatible with printing. The image data output by the IPU 211 is supplied to the printer unit 202 via the system bus 204.

The printer unit 202 includes a GAVD 220, a laser diode (LD) driver 221, and a VCSEL 222. In the example illustrated in FIG. 4, LD drivers (to be described later) respectively mounted on the LD driver ports 110Y, 110M, 110C, and 110K for the colors YMCK are collectively illustrated as the LD driver 221, and the VCSELs 100Y, 100M, 100C, and 100K are collectively illustrated as the VCSEL 222.

The GAVD 220 functions as a control unit that outputs various controls signals to the LD driver 221 to control driving of the VCSEL 222. The GAVD 220 also outputs a control signal to rotate the polygon mirror 104. The GAVD 220 receives the detection signals from the front-end synchronous detection sensors 107Y to 107K and the rear-end synchronous detection sensors 108Y to 108K. A detailed configuration of the GAVD 220 will be explained later.

The LD driver 221 generates an electrical current to drive each of the laser elements of the VCSEL 222 based on a drive control signal generated by the GAVD 220, and supplies the electrical current to the VCSEL 222.

The main control unit 203 includes a central processing unit (CPU) 230, a random access memory (RAM) 22, a read only memory (ROM) 232, an image storage 233, an input/output (I/O) control unit 234, all of which are communicably connected to one another via the system bus 204, and an interface 235 connected to the CPU 230. The CPU 230 controls the entire image forming apparatus according to a program stored in the ROM 232 by using the RAM 231 as a working memory.

The image storage 233 is a nonvolatile storage medium, such as a hard disk drive or a nonvolatile semiconductor memory, and stores image data of an image read by the scanner unit 201 for example. The I/O control unit 234 controls transmission and reception of drive control signals for various motors in the image forming apparatus or output signals from various sensors.

The interface 235 includes an operation unit and a display unit for user operation, and receives the user operation. The CPU 230 receives the user operation performed on the interface 235, calls a program module for executing a process corresponding to a command based on the received user operation from the ROM 232 for example, and executes the process, such as copying, facsimile, scan, or image storage.

To drive the printer unit 202 based on the image data acquired by the scanner unit 201 and to output images as electrostatic latent images on the photosensitive drums 76Y to 76K, she CPU 230 performs main-scanning direction control and sub-scanning position control of an image receiving material, such as a high-quality paper or a plastic film.

To cause the scanner unit 201 to start reading a document, the CPU 230 outputs a start signal to the GAVD 220. Upon receiving the start signal, the GAVD 220 outputs a signal MFSYNC_N to the IPU 211. The IPU 211 causes the scanner unit 201 to start a document read operation according to the signal MFSYNC_N.

Upon receiving the image data output based on the document read by the scanner unit 201, the GAVD 220 stores the received image data in a memory (to be described later) of the GAVD 220. The GAVD 220 performs predetermined processing on the image data stored in the memory, and outputs the processed image data to the LD driver 221.

The LD driver 221 generates a drive control signal for driving the VCSEL 222 based on the image data received from the GAVD 220. By causing the LD driver 221 to output the drive control signal to the VCSEL 222, the VCSEL 222 is caused to emit light in accordance with the image data. In this case, the LD driver 221 drives each of the laser elements of the VCSEL 222 by PWM control.

Figure 5:
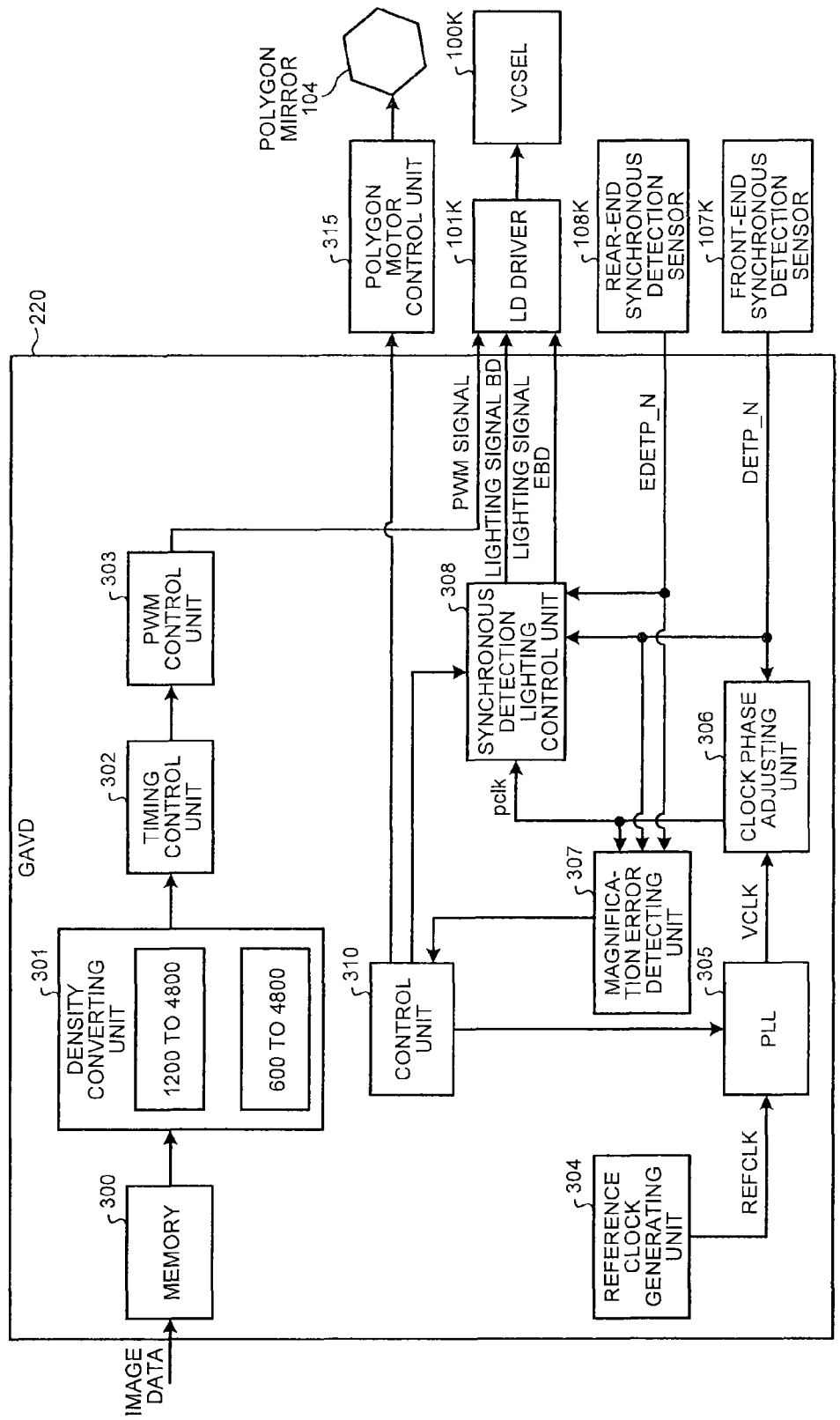
FIG. 5 is a block diagram illustrating a detailed configuration example of a GAVD applicable to the embodiment.

FIG. 5 illustrates a detailed configuration example the GAVD 220. The GAVD 220 includes, as a processing system for image data, a memory 300, a density converting unit 301, a timing control unit 302, and a pulse width modulation (PWM) control unit 303. In addition, the GAVD 220 includes, as a processing system for control signals including a synchronizing signal, a reference clock generating unit 304, a phase locked loop (PLL) 305, a clock phase adjusting unit 306, a magnification error detecting unit 307, a synchronous detection lighting control unit 308, and a control unit 310 that performs overall control.

First, the processing system for control signals in the GAVD 220 will be explained below. In the following, the configuration for the color K will be explained as a representative of the configurations for the colors YMCK in the optical device illustrated in FIG. 2. The descriptions related to the color K can appropriately be applied as the descriptions related to the other colors Y, M, and C. For example, the VCSEL 100K will be explained as a representative of the VCSELs 100Y, 100M, 100C, and 100K for all the colors.

When the laser elements $100K_1$ to $100K_{40}$ of the VCSEL 100K are arrayed as illustrated in FIG. 3, the front-end synchronous detection sensor 107K outputs, for example, a synchronous detection signal DETP_N that falls when a laser beam output by the laser element $100K_{21}$ of a channel ch#21 arranged on the front-end side in the main-scanning direction is detected. Similarly, the rear-end synchronous detection sensor 108K outputs a synchronous detection signal EDETP_N that falls when a laser beam output by the laser element $100K_{21}$ of the channel ch#21 is detected.

The synchronous detection signal DETP_N is supplied to the clock phase adjusting unit 306, the magnification error detecting unit 307, and the synchronous detection lighting control unit 308. In addition, the synchronous detection signal EDETP_N is supplied to the magnification error detecting unit 307 and the synchronous detection lighting control unit 308.

The magnification error detecting unit 307 measures time between the falling edge of the synchronous detection signal DETP_N on the front end to the falling edge of the synchronous detection signal EDETP_N on the rear end, accordance with a clock pclk to be described later. The magnification error detecting unit 307 compares the measured time with a reference time interval, and supplies the difference to the control unit 310. The control unit 310 generates correction data to correct the difference. The correction data is sent to the PLL 305.

The PLL 305 includes a voltage controlled oscillator (VCO) clock generating unit, a phase comparator, a low pass filter (LPF), a 1/M frequency divider, and a 1/N frequency divider.

The PLL 305 inputs, to the phase comparator, a first signal with the frequency obtained by dividing the frequency of a reference clock REFCLK generated by the reference clock generating unit 304 by M by the 1/M frequency divider and a second signal with the frequency obtained by dividing the frequency of a clock VCLK output from the PLL 305 by N by the 1/N frequency divider. The phase comparator compares the phases of the falling edges of the input first signal and the input second signal, and outputs an error component by constant current output. The output from the phase comparator is integrated by the LPL and supplied to the VCO clock generating unit. The VCO clock generating unit generates a clock VCLK with the frequency proportional to the output voltage of the LPF. The clock VCLK serves as an output from the PLL 305.

With this configuration, the PLL 305 can change the clock frequency of the clock VCLK to be output, by changing the frequency division ratio of the 1/M frequency divider according to the correction data received from the control unit 310.

The clock phase adjusting unit 306 generates a clock by synchronizing the clock VCLK output by the PLL 305 with the synchronous detection signal DETP_N on the front end. The clock is output as the pixel clock pclk and supplied to the magnification error detecting unit 307 and the synchronous detection lighting control unit 308. The pixel clock pclk is also supplied to the timing control unit 302 and the PWM control unit 303 although not illustrated.

As described above, by synchronizing the pixel clock pclk to be used as a reference of a lighting timing on a pixel-by-pixel basis in the VCSEL 100K with the synchronous detection signal DETP_N, it becomes possible to match rho phases of all of the lines, so that it becomes possible to normally reproduce a line in the sub-scanning direction (vertical line).

Furthermore, the clock phase adjusting unit 306 generates the pixel clock pclk obtained by synchronizing the clock VCLK with the synchronous detection signal DETP_N as described above. Therefore, the PLL 305 changes the frequency of the clock VCLK according to the correction data received from the control unit 310, so that the pixel clock pclk is accordingly changed. Moreover, the entire magnification of an image to be formed can be changed by changing the frequency of the pixel clock pclk.

The synchronous detection lighting control unit 308 generates lighting signals BD and FED for causing the VCSEL 100K to emit light on the front-end synchronous detection sensor 107K and the rear-end synchronous detection sensor 108K based on the synchronous detection signals DEEP_N and EDETP_N and the pixel clock pclk, under the control of the control unit 310 for example. The lighting signals BD and EBD are supplied to an LD driver 101K. The LD driver 101K corresponds to the LD driver 221 described above, and mounted on the LD driver port 110K.

Next, the processing system for image data in the GAVD 220 will be explained. For example, image data supplied by the IPU 211 of the scanner unit 201 is temporarily stored in the memory 300 in order to cancel out a difference the processing speed.

The image data read from the memory 300 is supplied no the density converting unit 301. As described above, in the embodiment, the resolution of the VCSEL 100K in the sub-scanning direction is 4800 dpi, while the resolution the image data in the sub-scanning direction is 1200 dpi. That is, the resolution of the image data is lower than tee resolution of the VCSEL 100K. Therefore, the density converting unit 301 converts the density of the input image data according to the resolution of the VCSEL 100K to obtain the image data with the resolution of 4800 dpi.

In the embodiment, other resolution, for example, the image data of 600 dpi, can be applied. Even in this case, similarly to the above, the density converting unit 301 converts the density of the input image data according to the resolution of the VCSEL 100K to obtain the image data with the resolution of 4800 dpi.

The image data with the resolution adjusted to 4800 dpi according to the VCSEL 100K by the density converting unit 301 is supplied to the timing control unit 302. As explained above with reference to FIG. 3, in the VCSEL 100K, the laser elements $100K_1$ to $100K_{40}$ are arranged so as to be sequentially shifted at predetermined intervals in the main-scanning direction. The timing control unit 302 controls the lighting timing of each of the laser elements $100K_1$ to $100K_{40}$ according to the position of each of the laser elements $100K_1$ to $100K_{40}$ in the main-scanning direction.

The image data for which a timing is controlled by the timing control unit 302 is supplied to the PWM control unit 303. The PWM control unit 303 converts the supplied imago data into a PWM signal for lighting the VCSEL 100K. The PWM signal is supplied to the LD driver 101K. The LD driver 101K causes the VCSEL 100K to emit light according to the supplied PWM signal.

The synchronous detection lighting control unit 300 generates the lighting signals BD and EBD for causing the VCSEL 100K to emit light at each of the positions of the front-end synchronous detection sensor 107K and the rear-end synchronous detection sensor 108K based on the synchronous detection signal DETP_N on the front end, the synchronous detection signal EDETP_N on the rear end, and the pixel clock pclk. The lighting signals BD and EBD are supplied to the LD driver 101K. The LD driver 101K causes the VCSEL 100K to emit light at a predetermined timing according to the lighting signals BD and EBD.

The control unit 310 supplies a control signal to control the rotation speed of the polygon mirror 104 to a polygon motor control unit 315. The polygon motor control unit 315 rotates the polygon mirror 104 at a predetermined speed according to the control signal.

An example of the operation of the memory 300 according to the embodiment will be explained below with reference to FIG. 6. In the example illustrated in FIG. 6, image data with the resolution of 1200 dpi and with the bit depth of 2 bits per pixel is input to the memory 300.

First, an example will be explained in which the image data with the resolution of 1200 dpi is stored in the memory 300 in FIG. 6. FIG. 6(*a*) indicates the synchronous detection signal DETP_N on the front end. A period from the fall to the next fall of the synchronous detection signal DETP_N corresponds to one main scanning.

In this example, the VCSEL 100K is configured such that the write resolution is 4800 dpi and the number of channels (the number the laser beams) is 40, and all of the channels are used. In the memory 300, pieces of image data of 10 lines are input during the period of one main scanning (hereinafter, simply referred to as a scanning period). The pieces of image data of 10 lines are subjected to density conversion such that each of the lines is converted to four lines through a density conversion process performed by the density converting unit 301, so that the resolution in the sub-scanning direction becomes 4800 dpi, as will be described later.

Figure 6:
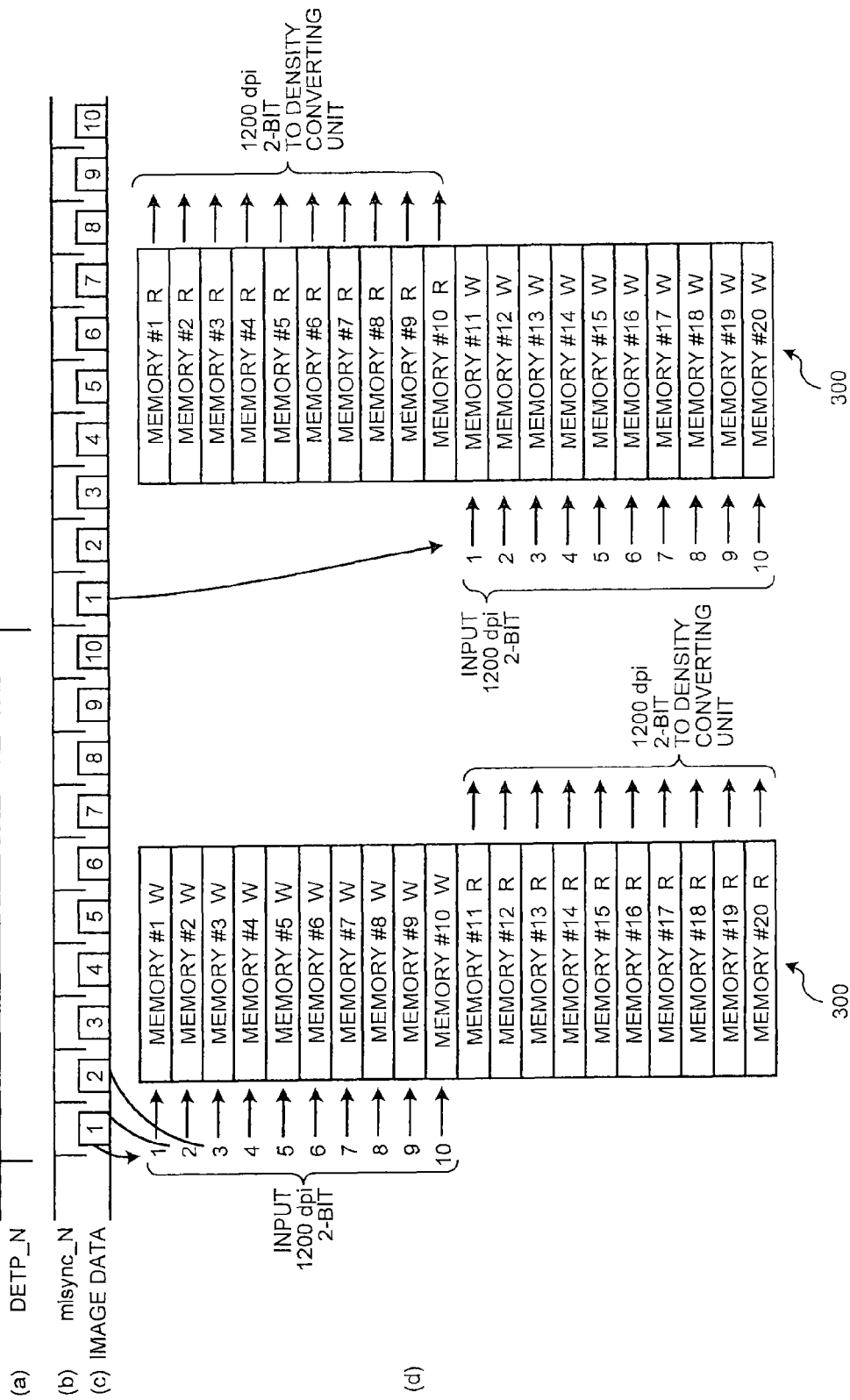
FIG. 6 is a diagram for explaining an example of the operation of a memory according to the embodiment.

In the GAVD 220, for example, the control unit 310 outputs a signal mlsync_N that falls 10 times during one scanning period to the IPU 211 of the scanner unit 201 (see FIG. 6(*b*)). The IPU 211 outputs image data of one line to the GAVD 220 every time the signal mlsync_N falls (see FIG. 6(*c*)).

The memory 300 includes, as illustrated in FIG. 6(*d*), 20 memory areas (memories #1 to #20) each being capable of storing image data of one line with the resolution of 1200 dpi and the bit depth of 2 bits per pixel. Therefore, pieces of image data of 20 lines can be stored in the memory 300. In this example, memory areas for 10 lines among all of the memory areas in the memory 300 serve as image data write area, and the remaining memory areas for another 10 lines serve as an image data read area. The GAVD 220 switches between the write area and the read area of the memory 300 at every main scanning. The pieces of image data of 10 lines read from the read area are output to the density converting unit 301.

If the write width in the main-scanning direction is, for example, 330 mm, and when the resolution is 1200 dpi and the bit depth per pixel is 2 bits, the capacity of the memory area for one line needs to be about 31200 bits. Therefore, in the embodiment, the capacity of the memory area for one line is set so as to correspond to 1024 words, where one word is 64 bits.

Figure 7:
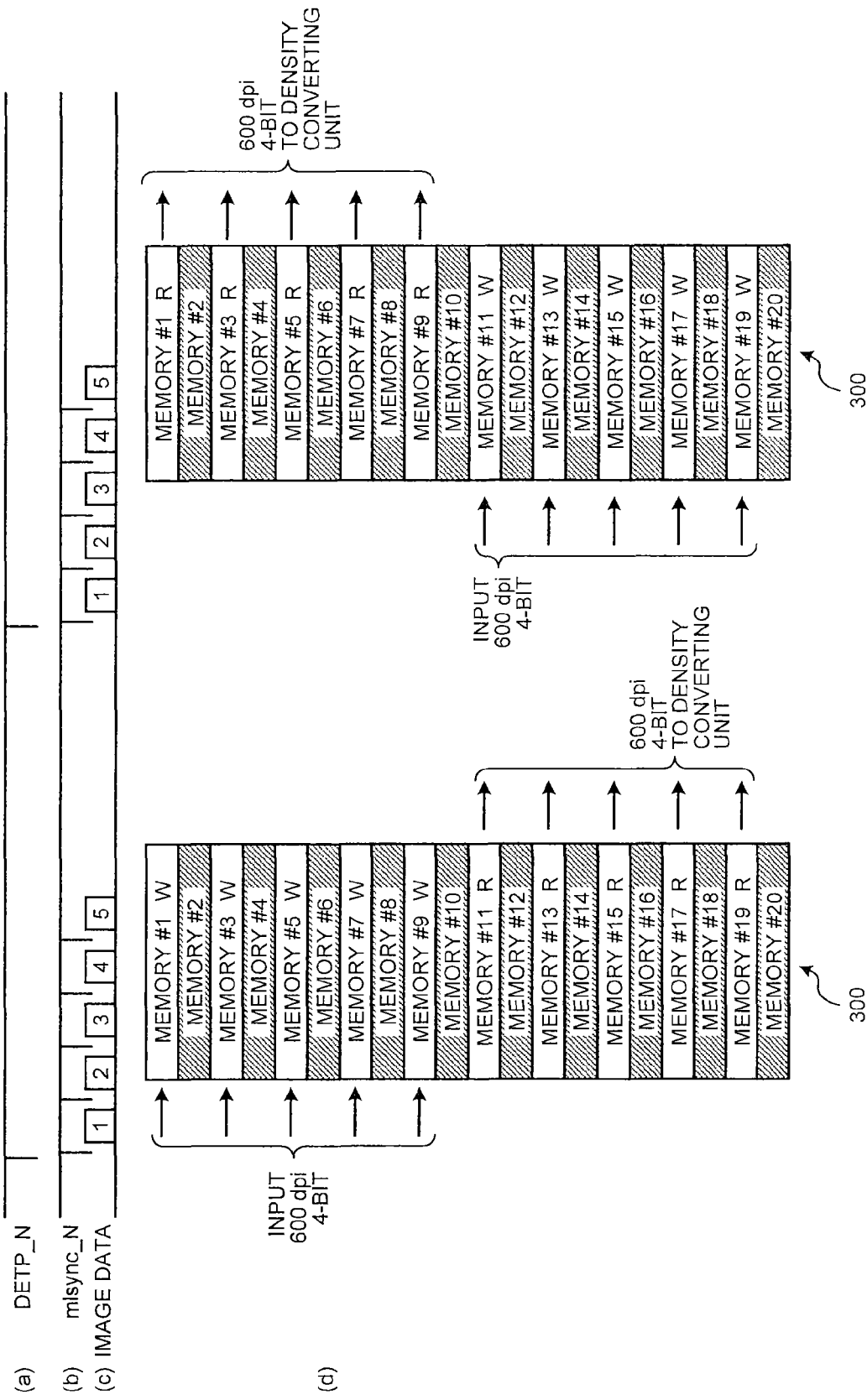
FIG. 7 is a diagram illustrating another example of the operation of the memory according to the embodiment.

FIG. 7 illustrates an example of the operation of the memory 300 when image data with the resolution of 600 dpi and with the bit depth of 4 bits per pixel is input. Components illustrated in FIG. 7 are the same as those illustrated in FIG. 6, and therefore, explanation thereof will not be repeated.

The amount of data in the main-scanning direction for data with the resolution of 600 dpi and with the bit depth of 4 bits per pixel is the same as the amount of data in the main-scanning direction for data with the resolution of 1200 dpi and with the bit depth of 2 bits per pixel. Therefore, is no problem to set the capacity of the memory area for one line to 64 bits×1024 words.

Pieces of image data of five lines with the resolution of 600 dpi and the bit depth of 4 bits are supplied from the IPU 211 to the GAVD 220 and input to the memory 300 during one scanning period. The pieces of image data of five lines are subjected to density conversion such that each of the lines is converted to eight lines through the density conversion process performed by the density converting unit 301, so that the resolution in the sub-scanning direction becomes 4800 dpi, as will be described later.

In the memory 300, as illustrated in FIG. 7(*d*), consecutive 10 memory areas serve as a write area, and the 10 memory areas are alternately used to store the pieces of image data of five lines. In addition, in the memory 300, the remaining 10 memory areas serve as a read area from which pieces of image data are read. The GAVD 220 switches between the write area and the read area of the memory 300 at every main scanning. In the memory 300, memory areas in which no image data is stored among the 10 memory areas are not used. However, as will be described later, the circuits on the subsequent stage (the density converting unit 301) are caused to operate.

In FIG. 7 and FIG. 18 to FIG. 20 to be described later, hatched areas in the memory areas indicate memory areas that are not used.

In the example in FIG. 7(*d*), in the N-th scanning, image data of each line is stored in a corresponding one of memories #1, #3, #5, #7, and #9 in the write area of the memory 300, and memories #2, #4, #6, #8, and #10 are not used. In addition, image data of each line is stored in a corresponding one of the memories #11, #13, #15, #17, and #19 in the read area of the memory 300, and memories #12, #14, #16, #18, and #20 are not used. In the next (N+1-th) scanning, the write area and the read area of the memory 300 are switched.

Next, the operation of the density converting unit 301 will be explained. FIGS. 8A to 8D schematically illustrate the operation of the density converting unit 301 on image data with the resolution of 1200 dpi and the bit depth of 2 bits. In the drawings and the explanation below, [hex] indicates that the number or the character just before it is a value represented in hexadecimal notation. In FIGS. 8A to 8D, examples of pixel values of 2-bit pixel data are illustrated. In these examples, it is assumed that the image data output from the memory 300 has the resolution of 1200 dpi in both of the main-scanning direction and the sub-scanning direction and the bit depth of 2 bits per pixel.

The density converting unit 301 converts the bit depth of each pixel of the image data from 2 bits to 4 bits and converts the image data to image data of four lines, so that the resolution of 4800 dpi in the sub-scanning direction can be obtained. The resolution in the main-scanning direction is maintained as 1200 dpi. The bit depth of each pixel is converted such that a single pixel with the bit depth of 2 bits before conversion is converted to 4 pixels for four lines with the bit depth of 4 bits.

Figure 8:
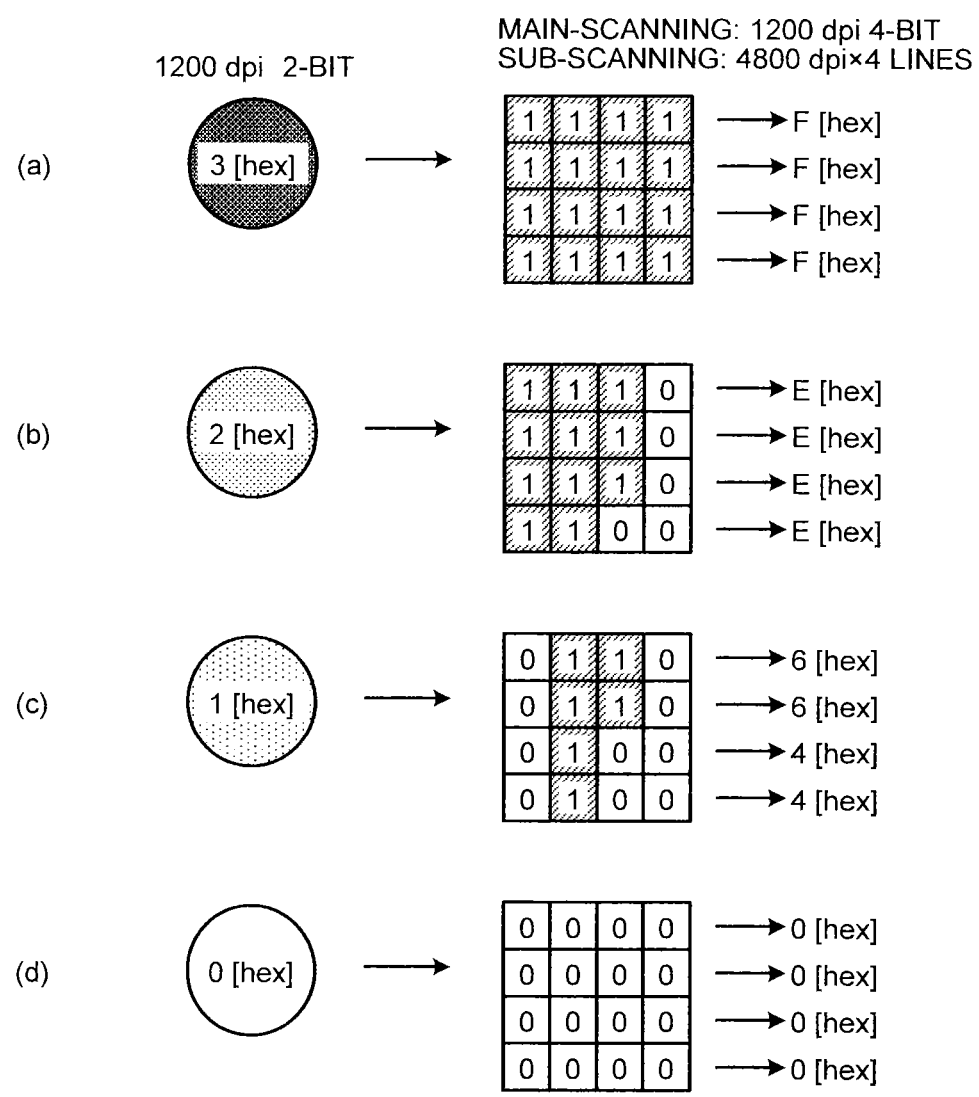
FIGS. 8A to 8D are diagrams schematically illustrating the operation of a density converting unit according to the embodiment.

In the example illustrated in FIGS. 8A to 8D, a pixel with a pixel value of 3 [hex] is converted to 4 pixels each having a pixel value of F [hex] (see FIG. 8A). In addition, a pixel with a pixel value of 1 [hex] is converted to 2 pixels each having a pixel value of 6 [hex] and to 2 pixels each having a pixel value of 4 [hex] (see FIG. 8C). The process performed by the density converting unit 301 to convert the pixel value of one pixel with the bit depth of 2 bits to the pixel values of 4 pixels with the bit depth of 4 bits as described above can be performed by using, for example, a table.

Figure 9:
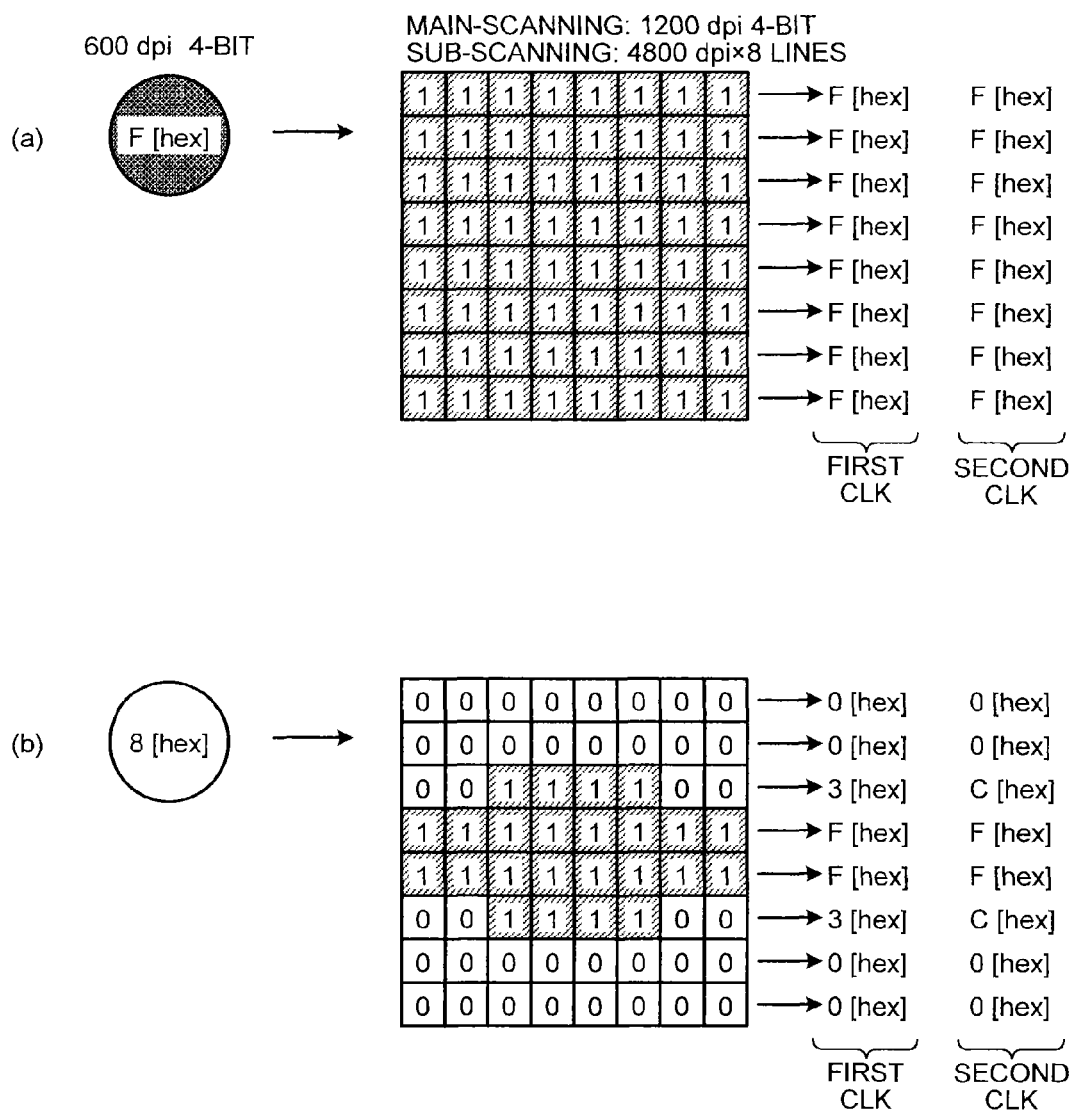
FIGS. 9A and 9B are diagrams schematically illustrating the operation of the density converting unit according to the embodiment.

FIGS. 9A and 9B schematically illustrate the operation performed by the density converting unit 301 on data with the resolution of 600 dpi and the bit depth of 4 bits. FIG. 9A indicates an example where a pixel value is F [hex], and FIG. 9B illustrates an example where a pixel value is 8 [hex]. The density converting unit 301 adds, in the main-scanning direction, a pixel with the bit depth of 4 bits to each of the pixels of image data with the bit depth of bits, to thereby obtain the resolution of 1200 dpi in the main-scanning direction. Namely, pixel data corresponding to two clocks clk is generated in the main-scanning direction. As for the sub-scanning direction, the pixel data is converted to pixel data of eight lines to thereby obtain the resolution of 4800 dpi in the sub-scanning direction. The conversion process of this case can also be performed by using, for example, a table.

Next, a process performed by the timing control unit 302 will be explained below. As explained above with reference to FIG. 3, in the VCSEL 100K, the laser elements $100K_1$ to $100K_{40}$ are arranged so as to be sequentially shifter at predetermined intervals in the main-scanning direction. Therefore, to apply laser beams in a line the sub-scanning direction and normally form a vertical line image, it is necessary to control the output timing of the laser beams for each of the laser elements $100K_1$ to $100K_{40}$.

Figure 10:
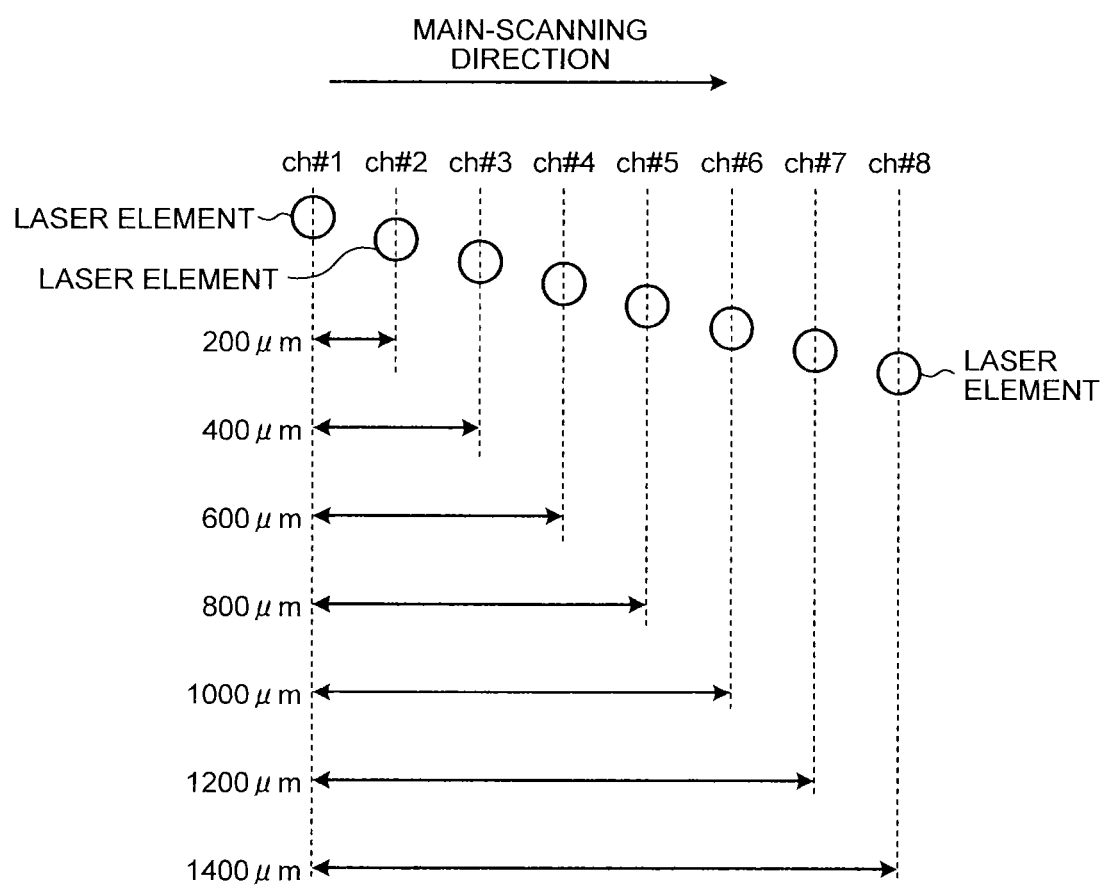
FIG. 10 is a diagram for explaining a process performed by a timing control unit according to the embodiment.

For example, as illustrated in FIG. 10, the laser elements of channels ch#1 to ch#8 are arranged at intervals of 200 µm. If main scanning is performed from the channel ch#1 to the channel ch#8, the output timing of each of the laser elements of the channel ch#2 to ch#8 is delayed with respect to the output timing of the laser element of the channel ch#1 according to a distance from a corresponding one of the channels ch#2 to ch#8 to the channel ch#1.

The output timing of each of the laser elements is controlled in units of a pixel in the resolution in the main-scanning direction (in this example, 1200 dpi=1200 pixel units) and in units of a unit smaller than one pixel (for example, a unit of 1/16 pixel). The timing control unit 302 performs control in units of a pixel. The timing control in units of the unit smaller than one is performed by the PWM control unit 303 to be described later.

A delay amount D of each of the laser elements can be obtained by Equation (1) below. In Equation (1), a value L indicates a distance from a reference laser element (for example, the laser element of the channel ch#1) to a target laser element in the main-scanning direction, and a value R indicates the resolution in the main-scanning direction.

$$D[dot]=(L\ (\mu m)/25.4\ (mm))\times R\ [dpi]/1000 \quad (1)$$

Detailed explanation is given below with reference to the example in FIG. 10. A distance between the laser element of the channel ch#4 and the laser element of the channel ch#1 is 600 µm. Therefore, each value is substituted into Equation (1) above and the delay amount of about 28.35 pixels is obtained.

Figure 11:
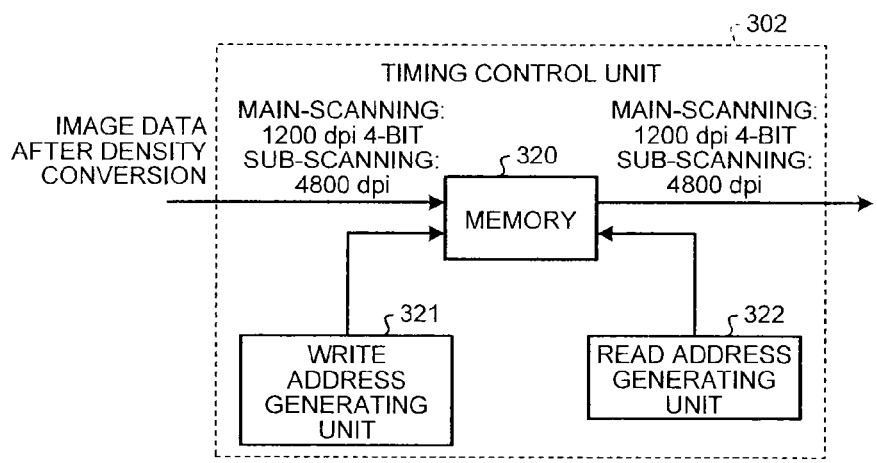
FIG. 11 is a block diagram illustrating a configuration example of the timing control unit according to the embodiment.

FIG. 11 illustrates a configuration example of the timing control unit 302. The timing control unit 302 includes a memory 320, a write address generating unit 321, and a read address generating unit 322. The memory 320 stores therein image data output from the density converting unit 301. The write address generating unit 321 generates a write address for writing the image data to the memory 320. The read address generating unit 322 generates a read address for reading image data from the memory 320.

The timing control unit 302 writes the supplied image data in the memory 320 according to the write address generated by the write address generating unit 321. The timing control unit 302 delays reading the image data from the read address generated by the read address generating unit 322 by the amount of time corresponding to the pixel clock pclk indicated by the delay amount D obtained by Equation (1). In the above example, the read is delayed 28 clocks of the pixel clock pclk.

The configuration illustrated in FIG. 11 is the configuration for one laser element. In the embodiment, the VCSEL 100K has the 40 laser elements $100K_1$ to $100K_{40}$. Therefore, the timing control unit 302 has as many configurations of FIG. 11 as the number (40) of the laser elements.

Figure 12:
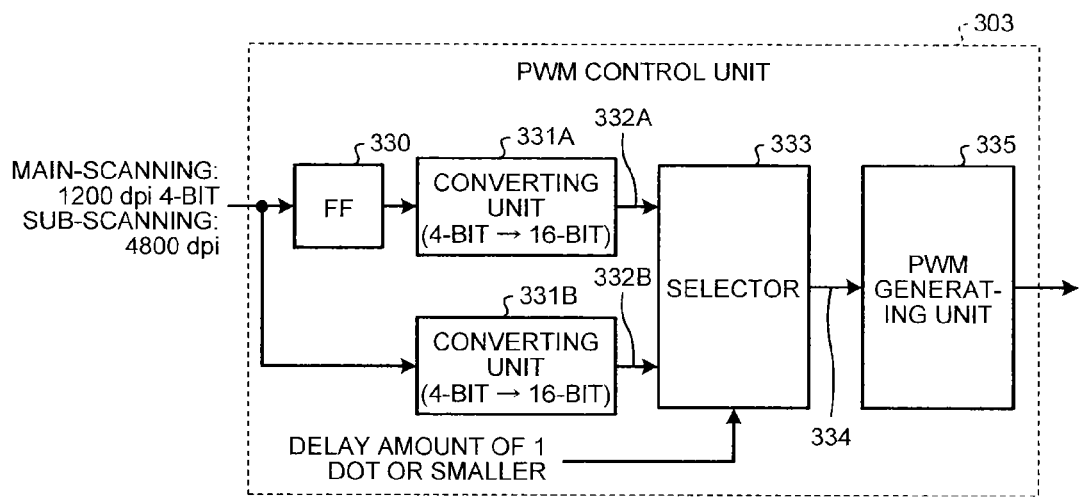
FIG. 12 is a block diagram illustrating a configuration example of a PWM control unit according to the embodiment.

FIG. 12 illustrates a configuration example of the PWM control unit 303. The PWM control unit 303 includes a flip-flop circuit (FF) 330, converting units 331A and 331B, a selector 333, and a PWM generating unit 335.

Image data output from the timing control unit 302 is input to the PWM control unit 303 in units of a pixel and supplied to the converting unit 331B and the FF 330. The FF 330 supplies the image data to the converting unit 331A after a delay of one pixel clock pclk. That is, two pieces of pixel data adjacent to each other in the main-scanning direction are respectively supplied to the converting units 331A and 331B.

Figure 13:
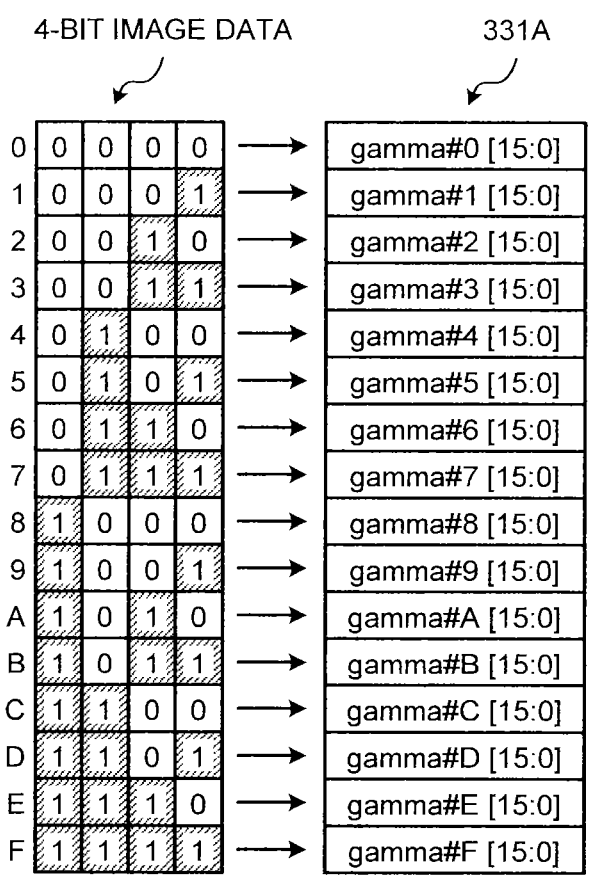
FIG. 13 is a diagram for explaining a conversion process performed by a converting unit according to the embodiment.

Each of the converting units 331A and 331B converts the pixel data with the bit depth of 4 bits to the pixel data with the bit depth of 16 bits. The conversion process performed by the converting units 331A and 331B will be explained below with reference to FIG. 13. The converting units 331A and 331B perform the same process; therefore, the process performed by the converting unit 331A will be explained below by way of example.

The converting unit 331A includes registers for storing 16-bit values gamma#0[15:0] to #15[15:0], each corresponding to a corresponding one of values each represented by 4 bits, and outputs the 16-bit value corresponding to the value of the input pixel data. In the example illustrated in FIG. 13, pixel data with a pixel value of 8 [hex] is converted to a value gamma#8[15:0]. Each of the values gamma#0[15:0] to #0[15:0] is determined and stored in the register in advance when, for example, the image forming apparatus is designed.

Pieces of 16-bit pixel data 332A and 332B output by the converting units 331A and 331B are supplied to the selector 333. The selector 333 gives delay in units of the unit smaller than one pixel to the input pieces of the pixel data 332A and 332B. In the embodiment, the selector 333 gives delay to the pieces of the pixel data 332A and 332B in units of a bit. Specifically, the selector 333 gives, to the piece of the pixel data, delay of the amount corresponding to the value after the decimal point of the delay amount D obtained by Equation (1) above.

Figure 14:
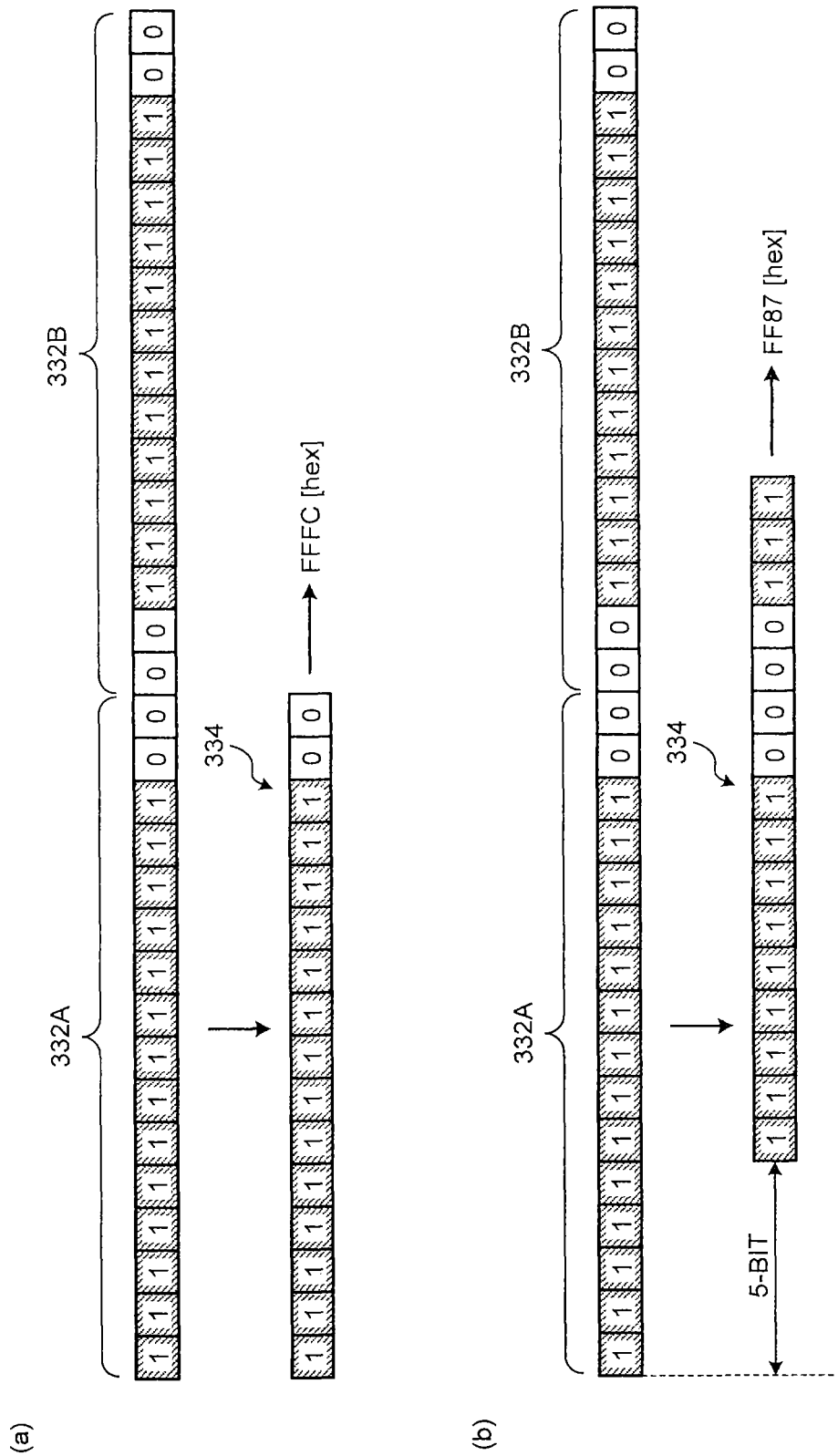
FIGS. 14A and 14B are diagrams for explaining the operation of a selector according to the embodiment.

The operation performed by the selector 333 will be explained below with reference to FIGS. 14A and 14B. FIG. 14A illustrates an example where no delay is given (delay=0). It is assumed that a pixel value of the pixel data 332A is FFFC [hex] and a pixel value of the pixel data 332B is 3FFC [hex] (for both of which, the leftmost bit serves as the most significant bit (MSB)). It is also assumed that the pixel data 332A is pixel data of a top pixel of a line. In this case, as illustrated in the lower part of FIG. 14A, the selector 333 selects bits starting from the MSB of the pixel data 332A. Therefore, pixel data 334 serving as the top pixel of the line output from the selector 333 has the same value as the pixel data 332A.

FIG. 14B illustrates an example where a predetermined delay is given. For example, in the example of Equation (1) described above, the delay amount after the decimal point is 0.35 pixel. In this example, because one pixel corresponds to 16 bits, 0.35 pixel corresponds to 5.6 bits. In FIG. 14B, according to the delay amount D=0.35 pixel, a delay of 5 bits is given to a line. Specifically, as illustrated in a lower part of FIG. 14B, the selector 333 gives a delay of 5 bits to the MSB of the pixel data 332A, and selects and outputs bits starting from the sixth bit. Therefore, the pixel data 334 serving as the top pixel of a line output form the selector 333 becomes data with a value of FF87 [hex] formed of bits from the sixth bit to the least significant bit (LSB) of the pixel data 332A and bits from the MSB to the fifth bit of the next pixel data 332B.

The pieces of the output data 334 sequentially output from the selector 333 are supplied to the PWM generating unit 335. The PWM generating unit 335 generates a PWM signal according to the supplied bit value of the output data 334, and supplies the PWM signal to the LD driver 101K.

Process According to the Embodiment

Next, write control according to the embodiment will be explained below. As described above, when a plurality of process line speeds are taken into account in the image forming apparatus, it is necessary to change at least one of the rotation speed of the polygon mirror 101 and the intensity of the laser beam applied to the photosensitive drum 76K in order to maintain the constant exposure amount per unit length in the main-scanning direction between different process line speeds. In the embodiment, when the light source that can output multiple laser beams is used, the number of laser beams output from the light source is first set and the rotation frequency of the polygon mirror 104 is next set.

the following, as the process line speeds, a first line speed serving as a default, a second line speed with a line-speed change ratio of 90% with respect to the first line speed, and a third line speed with the line-speed change ratio of 82% with respect to the first line speed are considered. When the first line speed is set to 360 mm/sec, the second line speed is 324 mm/sec and the third line speed is 295.2 mm/sec. For example, the image forming apparatus can switch between the first line speed, the second line speed, and the third line speed depending on the thickness of a printing medium or image forming conditions. In the following, "the line-speed change ratio with respect to the first line speed" is simply referred as a "change ratio" unless otherwise specified.

FIG. 15 illustrates specifications for controlling write at each line speed. It is assumed that the first line speed is 360 mm/sec and the number of the laser beams at this time is 40 that is the same as the number of the laser elements $100K_1$ to $100K_{40}$ of the VCSEL 100K. In addition, the rotation frequency of the six-sided polygon mirror 104 per unit time is 17007.87 rpm (rotation per minute), the light intensity, i.e., the power applied to the VCSEL 100K is 0.200 mW, and the write clock frequency (the frequency of the pixel clock pckl) is 40 MHz.

Conditions of each of the second line speed and the third line speed are calculated with respect to the first line speed. A unit N for changing the number of laser beams is determined according to Equation (2) below. Equation (2), a value D is the write resolution of the VCSEL 100K and a value $N_{max}$ is the maximum resolution of image data before density conversion.

$$N=D/N_{max} \quad (2)$$

If the write resolution D of the VCSEL 100K is 4800 dpi and the maximum resolution $N_{max}$ of the image data before the density conversion is 1200 dpi, N=4. Therefore, in this case, the number of the laser beams is changed in units of four lines (see FIG. 3B).

A method for calculating the conditions of the second line speed will be explained below. First, the number of laser beams is reduced because the second line speed is lower than the first line speed. The number or the laser beams to be reduced is denoted by (N×n) based on the unit N described above. According to Equation (3) below, an integer value n is obtained such that a ratio P of the number obtained by subtracting the number (N×n) from the number A of the laser beams of the VCSEL 100 to the number A becomes the closest to the change ratio of the second line speed.

$$P=(A-N\times n)/A \quad (3)$$

Because the change ratio of the second line speed is 90%, when n=1, a value P=0.9, so that the value P matches the change ratio. Therefore, the number Ln of the laser beams output by the light source (the VCSEL 100K) should be 36 according to Equation (4) below.

$$Ln=A-N\times n \quad (4)$$

FIGS. 16A and 16B illustrate examples of laser elements used in the VCSEL 100K at the first line speed and the second line speed. At the first line speed, as illustrated in FIG. 16A for example, all of the channels ch#1 to ch#40 are used with respect to the laser elements $100K_1$ to $100K_{40}$ of the VCSEL 100K.

On the other hand, at the second line speed, as illustrated in FIG. 16B for example, 36 channels, in particular, the channels ch#1 to #36 are used with respect to the laser elements $100K_1$ to $100K_{40}$ of the VCSEL 100K. At this time, to maintain the resolution of 4800 dpi in the sub-scanning direction, consecutively-arranged laser elements composed of the laser elements $100K_1$ to $100K_{36}$ are used.

Next, when the number of the laser beams is changed, difference between the ratio P and the change ratio of the line speed with respect to the first line speed is corrected by changing the rotation frequency of the polygon mirror 104. In the case of the second line speed, because the ratio P matches the change ratio, a difference is zero. Therefore, the rotation frequency of the polygon mirror 104 is set to 17007.87 rpm, which is the same as that of the first line speed. In addition, at the second line speed, the light intensity and the write clock frequency are set to 0.200 mW and 40 MHz, respectively, which are the same as those at the first line speed.

When the number of the laser beams is changed, the ratio P of the number of the laser beams after the change to the number of the laser beams before the change corresponds to a ratio of the exposure amount per unit length in the main-scanning direction after the change in the number of the laser beams to the exposure amount before the change in the number of the laser beams. Similarly, the change ratio corresponds to a ratio of the exposure amount per unit length in the main-scanning direction after a change in the process line speed to the exposure amount before the change in the process line speed. Therefore, the difference between the ratio P and the change ratio corresponds to a difference between the exposure amount per unit length in the main-scanning direction after the change in the line speed and the exposure amount after the change in the number of the laser beams.

A method for calculating the conditions of the third line speed will be explained below. Similarly to the second line speed, because the third line speed is lower than the first line speed, the number of the laser beams first reduced. In the case of the third line speed, the change ratio is 82%. Therefore, the ratio P is obtained according to Equation (3) such that when n=2, the ratio P=0.8, which is the closest to the change ratio. The number of the laser beams at this time is 32 according to Equation (4) described above.

At the third line speed, as illustrated in FIG. 16C for example, 32 channels, in particular, the channels ch#1 to ch#32 are used with respect to the laser elements 100K to $100K_{40}$ of the VCSEL 100K. At this time, to maintain the write resolution of 4800 dpi in the sub-scanning direction, the consecutively-arranged laser elements composed of the laser elements $100K_1$ to $100K_{32}$ are used.

Subsequently, a difference between the ratio P and change ratio after the change in the number of the laser beams is corrected by correcting the rotation frequency of the polygon mirror 104. In the case of the third line speed, the difference between the ratio P and the change ratio is 0.02. The rotation frequency R of the polygon mirror 104 for correcting the difference can be obtained by Equation (5) below for example. In Equation (5), a value V is the line speed, a value S is the write resolution, and a value m is the number of sides of the polygon mirror 104.

$$R \text{ [rpm]} = \{(V \text{ [mm/sec]} \times S \text{ [dpi]})/(25.4 \text{ [mm]} \times Ln)\} \times (60 \text{ [sec]}/m) \quad (5)$$

In the case of the third line speed, the line speed 295.2 mm/sec, the write resolution is 4800 dpi, the number of light sources is 32, and the number of sides is 6. Therefore, according to Equation (5), the rotation frequency is obtained such that R=17433.07 rpm.

At the third line speed, the rotation frequency of the polygon mirror 104 differs from the rotation frequency a the first line speed. Therefore, it is necessary to change the light intensity and the write clock frequency. Light intensity $Lu_3$ is obtained according to Equation (6) below, based on a ratio between rotation frequency $R_1$ of the polygon mirror 104 at the first line speed and rotation. frequency $R_3$ of the polygon mirror 104 at the third Line speed. In Equation (6), light intensity $Lu_1$ represents light intensity at the first line speed.

$$Lu_3 \text{ [mW]} = Lu_1 \text{ [mW]} \times (R_3 \text{ [rpm]}/R_1 \text{ [rpm]}) \quad (6)$$

Similarly, write clock frequency $f_3$ at the third line speed is obtained by Equation (7) below, where $f_1$ represents the write clock. frequency at the first line speed.

$$f_3 \text{ [MHz]} = f_1 \text{ [MHz]} \times (R_3 \text{ [rpm]}/R_1 \text{ [rpm]}) \quad (7)$$

By substituting specific values into the Equations (6) and (7) as described above, the light intensity $Lu_3$ of 0.205 mW and the write clock frequency $f_3$ of 41.0 MHz are obtained. for the third line speed.

When both of the number of the laser beams and the rotation frequency of the polygon mirror 104 are changed, it is preferable to determine the number of the laser beams such that a change in the exposure amount per unit length in the main-scanning direction due to the change in the number of the laser beams becomes greater than a change in the exposure amount due to the change in the rotation frequency of the polygon mirror 104.

Figure 17:
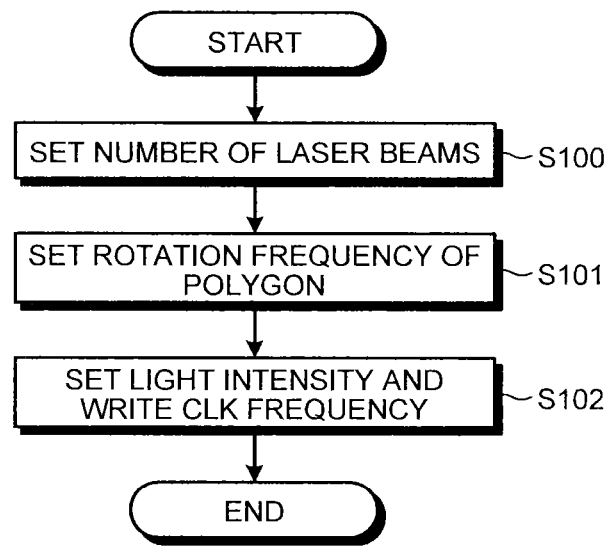
FIG. 17 is a flowchart illustrating an example of the operation performed by the GAVD to change a process line speed according to the embodiment.

FIG. 17 is a flowchart illustrating an example or the operation performed by the GAVD 220 for switching between the process line speeds. In the main control unit 203, when receiving a process line speed switching request, the CPU 230 obtains the number of laser beams to corresponding to the switched process line speed according to Equations (2) to (4) as described above, and sets the obtained number of the laser beams Ln in a register (not illustrated) of the GAVD 220 (Step S100).

The GAVD 220 causes each of the LD driver ports 100Y, 100M, 100C, and 100K to forcibly turn off the laser elements that are riot to be used, in accordance with the number of the laser beams Ln set in the register. The GAVD 220 also turns off image data paths for the laser elements that are not to be used in the GAVD 220, in accordance with the number of the laser beams Ln set in the register.

The CPU 230 sets the number of transferred image-data corresponding to the number of the laser beams Ln in one horizontal scanning to the IPU 211 of the scanner unit 201 in order to change the number of transferred image data to the GAVD 220 in one horizontal scanning.

At Step S101, the CPU 230 calculates the rotation frequency A of the polygon mirror 104 corresponding to the changed process line speed according to Equation (5) as described above, and sets the rotation frequency R in the register of the GAVD 220. In the GAVD 220, the control unit 310 issues, to the polygon motor control unit 315, a command to rotate the polygon mirror 104 at the set rotation frequency R.

At Step S102, the CPU 230 calculates the light intensity Lu and the write clock frequency f corresponding to the changed process line speed according to Equations (6) and (7) as described above, and sets the light intensity Lu and the write clock frequency f in the register of the GAVD 220.

In the GAVD 220, for example, the control unit 310 generates correction data for changing the frequency division ratio M of the 1/M frequency divider based on the set write clock frequency f, and supplies the generated correction data to the PLL 305. The pixel clock pclk corrected based on the correction data is output from the PLL 305. In addition, the control unit 310 causes LD drivers 101Y to 101K to emit light from the VCSELs 100Y to 100K at the set light intensity Lu. For example, each of the LD drivers 101Y to 101K changes an output of each of the channels ch used In the VCSELs 100Y to 100K under the control of the control unit 310.

It is explained that the CPU 230 calculates the number of the laser beams Ln, the rotation frequency R of the polygon mirror 104, the light intensity Lu of the VCSELs 100Y to 100K, and the write clock frequency f every time the process line speed is changed. However, is not limited to this example. For example, when available process line speeds are already known, the CPU 230 or the GAVD 220 may hold, as a table, the specifications for each of the process line speeds as illustrated in FIG. 15 that is obtained in advance, and set each value by referring to the table according to the designated process line speed.

Memory Access

Figure 18:
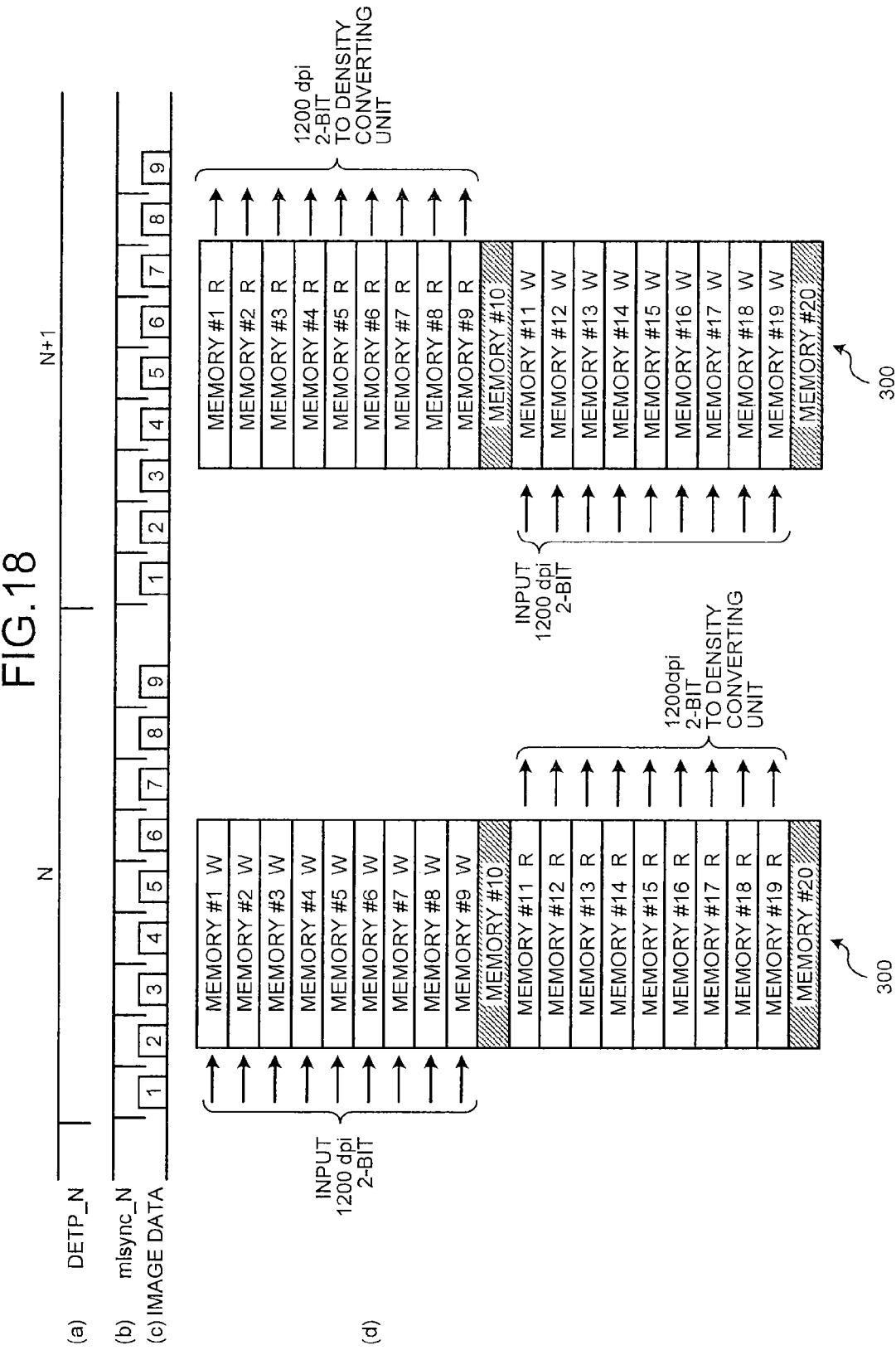
FIG. 18 is a diagram illustrating an example access to the memory according to the embodiment.

Next, access to the memory 300 at the second line speed and the third line speed. will be explained below. FIG. 18 illustrates an example of access to the memory 300 when the process line speed is set to the second line speed and the resolution of image data input to the memory 300 is 1200 dpi. Components illustrated in FIG. 18, FIG. 19, and FIG. 20 (to be described later) are the same as those illustrated in FIG. 6, and therefore, explanation thereof will not be repeated.

In the case of the second line speed, as described above, the 36 channels ch#1 to ch#36 among the channels ch#1 to ch#40 of the VCSEL 100K are used, and the channels ch#37 to ch#40 are not used. Therefore, as for the input image data with the resolution of 1200 dpi in the sub-scanning direction, image data of 9 lines corresponding to the 36 lines at the write resolution of 4800 dpi in the sub-scanning direction is input from the IPU 211 to the GAVD 220.

In this case, as illustrated in FIG. 18(*d*) for example, the GAVD 220 alternately use a set of the nine memories to #9 and a set of the nine memories #11 to #19 as the read area and the write area among the memory areas in the memory 300. On the other hand, the GAVD 220 does not use the memories #10 and #20, and stops the operation of circuits on the subsequent stages of the memories #10 and #20.

Figure 19:
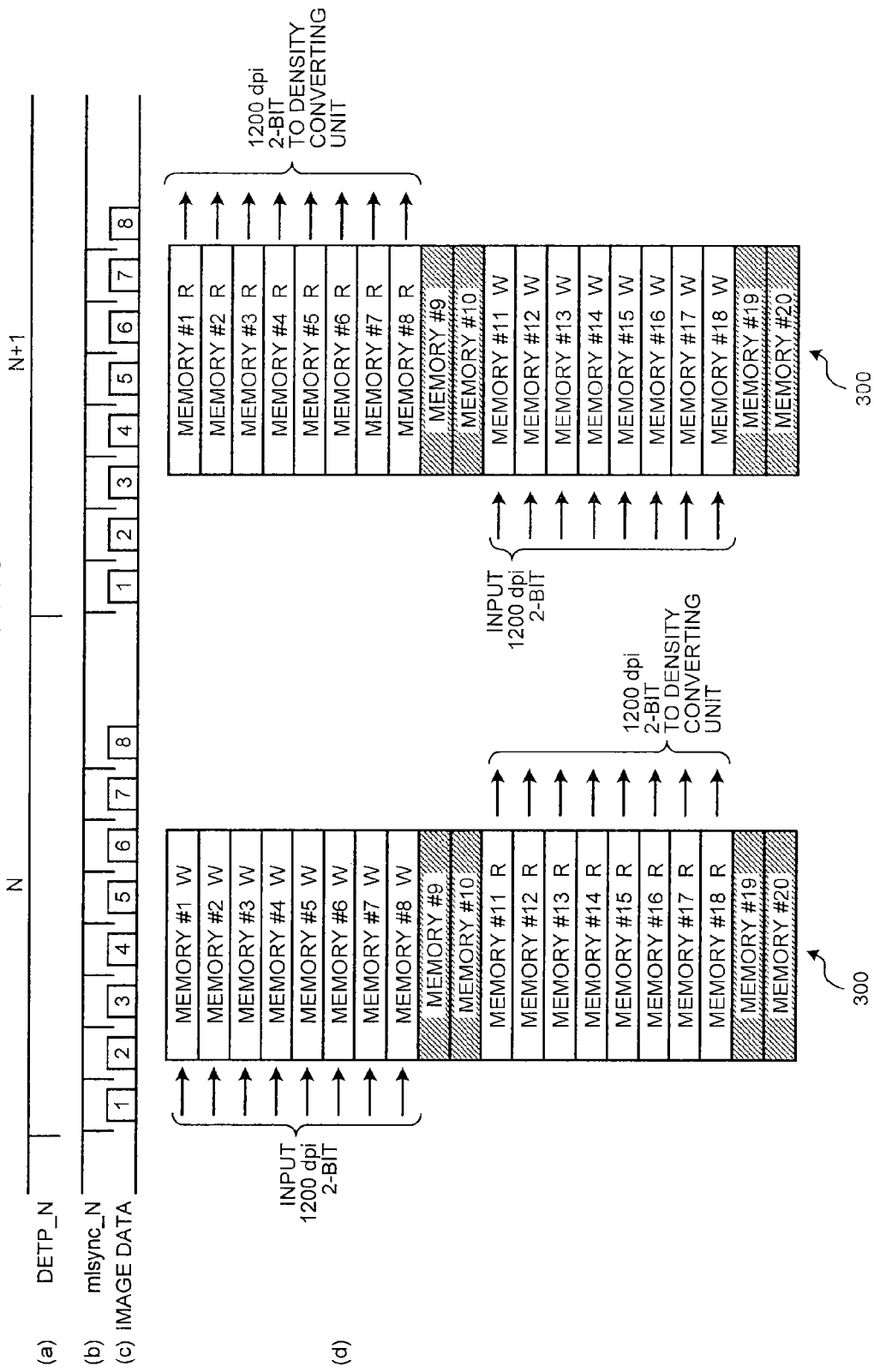
FIG. 19 is a diagram illustrating another example of access to the memory according to the embodiment.

FIG. 19 illustrates an example of access to the memory 300 when the process line speed is the third line speed and the resolution of image data input to the memory 300 is 1200 dpi. In the case of the third line speed, as described above, the 32 channels ch#1 to ch#32 among the channels ch#1 to ch#40 of the VCSEL 100K are used, and the channels ch#33 to ch#40 are not used. Therefore, as for the input image data with the resolution of 1200 dpi in the sub-scanning direction, image data of eight lines corresponding to the 32 lines at the write resolution of 4800 dpi in the sub-scanning direction is input from the IPU 211 to the GAVD 220.

In this case, as illustrated in FIG. 19(*d*) for example the GAVD 220 alternately uses a set of the eight memories #1 to

8 and a set of the eight memories #11 to #18 as the read area and the write area among the memory areas in the memory 300. On the other hand, the GAVD 220 does not use the memories #9 and #10 and the memories #19 and #20, and stops the operation of circuits on the subsequent stages of the memories #9 and #10 and the memories #19 and #20.

Figure 20:
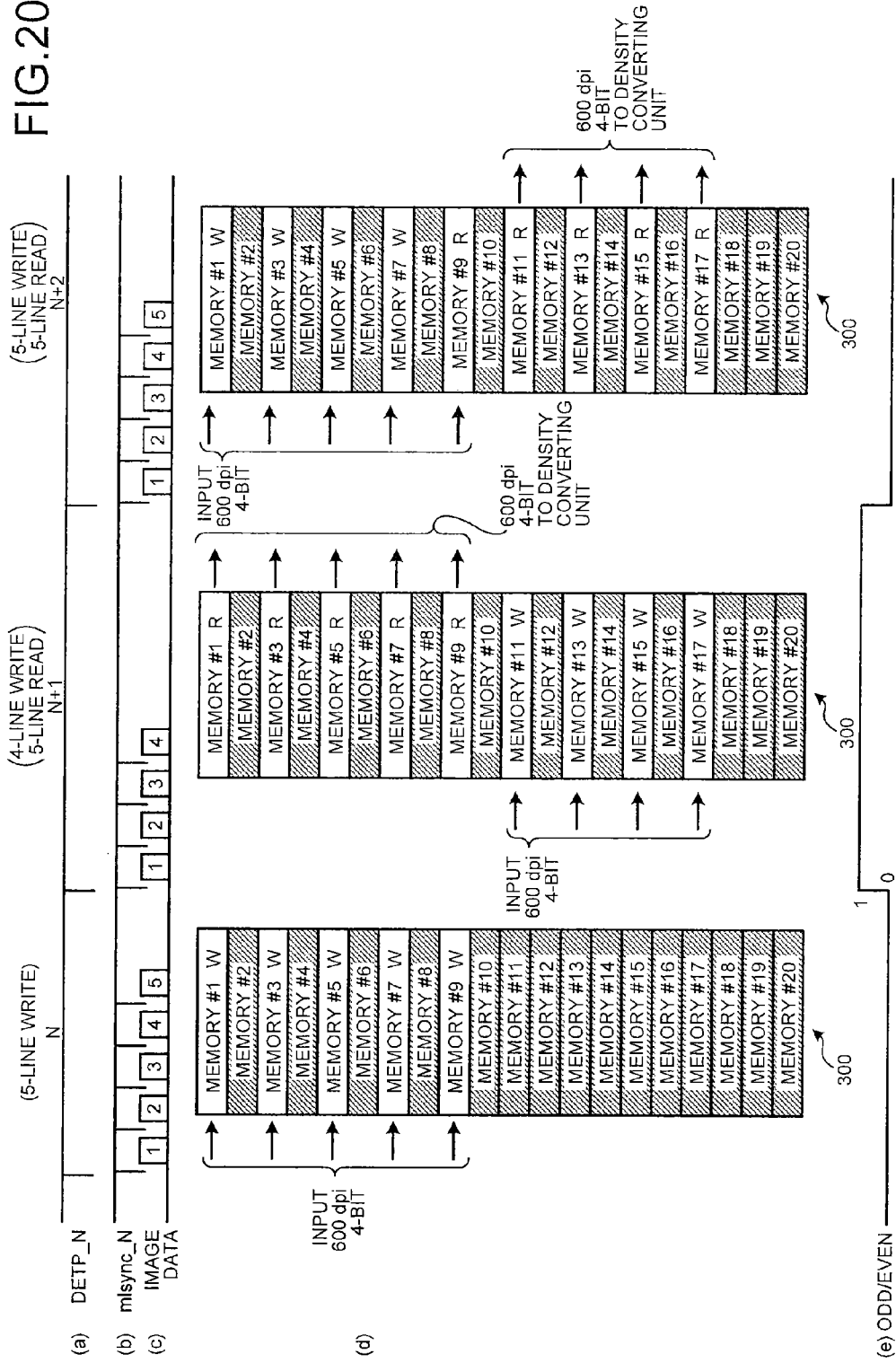
FIG. 20 is a diagram illustrating still another example of access to the memory according to the embodiment.

FIG. 20 illustrates an example of the operation of access to the memory 300 when the process line speed is the second line speed and image data with the resolution of 600 dpi and the bit depth of 4 bits per pixel is input. In the case of the second line speed, the 36 channels among the 40 channels of the VCSEL 100K are used. While, the density conversion is performed on the image data to convert each line into eight lines by the density converting unit 301 as explained above with reference to FIGS. 9A and 9B.

If the data amount of the image data input to the memory 300 and the data amount of the image data output to the LD driver 101K do not match each other, data loss may occur in the image data or memory shortage may occur. Therefore, in the embodiment, the GAVD 220 switches between an ODD period, in which the pieces of image data of five lines are input from the IPU 211 to the memory 300, and an EVEN period, in which the pieces of image data of four lines are input, at every scanning.

In the example in FIG. 20(d), in the first scanning period (assumed as the N-th scanning), the GAVD 220 sends a request for the pieces of image data of five lines to the IPU 211, and stores the pieces of image data of five lines input according to the request into the memories #1, #3, #5, #7, and #9 in the area of the memory 300.

In the second scanning period, the GAVD 220 sends a request for the pieces of image data of four lines to the IPU 211, and stores the pieces of image data of four lines input according to the request into the memories #11, #13, #15, and #17 in the area of the memory 300. Furthermore, the GAVD 220 reads the pieces of image data from the memories #1, #3, #5, #7, and #9 and outputs the pieces of image data to the density converting unit 301.

In the third scanning period, the GAVD 220 sends a request for the pieces of image data of five lines to the IPU 211, and stores the pieces of image data of five lines input according to the request into the memories #1, #3, #5, #7, and #9 in the area of the memory 300. The GAVD 225 reads the pieces of image data from the memories #1, #3, #5, #7, and #9 and outputs the pieces of image data to the density converting unit 301.

Incidentally, the control unit 310 generates an ODD/EVEN signal indicating a 5-line write period (ODD) and a 4-line write period (EVEN). FIG. 20(e) illustrates an example of the ODD/EVEN signal. In this example, the ODD/EVEN signal of "0" indicates an ODD period and the signal of "1" indicates an EVEN period. The ODD/EVEN signal is supplied to the density converting unit 301.

FIGS. 21A and 21B illustrate examples of the operation performed by the density converting unit 301 when the image data with the resolution of 600 dpi and the bit depth of 1 bits is input at the second line speed. FIGS. 21A and 21B correspond to the drawings in the center of FIGS. 9A and 9B, respectively.

FIG. 21A illustrates an example of the operation performed by the density converting unit 301 in the EVEN period, that is, in the period of 4-line write/5-line read, when the value of the ODD/EVEN signal is set to "1". In this case, the pieces of image data of five lines are input from the memory 300 to the density converting unit 301. The density converting unit 301 performs density conversion on each of the five lines to obtain the pieces of image data of eight lines, and allocates the pieces of image data of eight lines to each of the channels ch#1 to ch#8, the channels ch#9 to ch#16, the channels ch#17 to ch#24, the channels ch#25 to ch#32, and the channels ch#33 to ch#40.

On the other hand, as illustrated in FIG. 21B for example, when the value of the ODD/EVEN signal is set to "0" in the ODD period, that is, in the period of 5-line write/4-line read, pieces of image data of four lines are input from the memory 300 to the density converting unit 301. The density converting unit 301 performs density conversion on each of the four lines to obtain the pieces of image data of eight lines, and allocates the pieces of image data of eight lines to each of the channels ch#5 to ch#12, the channels ch#13 to ch#20, the channels ch#21 to ch#28, and the channels ch#29 to ch#36.

In this way, the density converting unit 301 charges combination of the channels in the VCSEL 100K to which the image data of each line after the density conversion is allocated, according to the number of lines of the input image data. For example, the density converting unit 301 includes a selector (not illustrated), and controls the selector according to the ODD/EVEN signal so that image data of each line can be output to a corresponding line path after the density conversion.

The memory access and the operation performed by she density converting unit 301 at the second line speed and the third line speed as described above are not limited to the second line speed and the third line speed, and can be applied to other line speeds.

As explained above, in the embodiment, the number of the laser beams is first changed according to a change the process line speed, and the rotation frequency of the polygon mirror 104 is subsequently changed. Therefore, even when there is the upper limit or the lower limit of the light emission power of the light source, it is possible to appropriately expose the photosensitive drum. In addition, it is possible to reduce dependence on the change ratio of the number of laser beams when controlling the exposure.

Furthermore, in the embodiment, the exposure is controlled by changing the number of the laser beams. Therefore, it is not necessary to greatly change the light intensity in each of the laser elements. Consequently, becomes possible to use the laser elements for a long time.

According to the embodiment, it is made possible to appropriately expose the photosensitive drum according to the process line speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a driving unit that drives a light source that outputs light beams;
   a deflecting unit that scans a scanning surface in a main-scanning direction by deflecting the light beams, the scanning surface moving at a predetermined line speed in a sub-scanning direction; and
   a control unit that
      changes a number of the light beams according to the predetermined line speed by controlling the driving unit,
      changes a scanning speed of the deflecting unit in the main-scanning direction according to a difference between an exposure amount per unit length in the main-scanning direction after a change in the number of the light beams and a predetermined exposure amount, and changes light intensity of each of the light beams output by the light source according to an amount of a change in the scanning speed, wherein the driving unit has a first mode in which a first set of a first predetermined number of adjacent light beams is driven by a single piece of data, and a second mode in which a second set of a second predetermined number of adjacent light beams is driven by a single piece of data, and the control unit changes the number of the light beams in units of a greater number of the light beams between a number of the light beams of the first set and a number of the light beams of the second set.

2. The optical scanning device according to claim 1, wherein the driving unit drives the first set of the first predetermined number of adjacent light beams or the second set of the second predetermined number of adjacent light beams.

3. The optical scanning device according to claim 1, wherein the control unit changes the number of the light beams such that a change in the exposure amount due to the change in the number of the light beams is greater than a change in the exposure amount due to the change in the scanning speed of the deflecting unit.

4. The optical scanning device according to claim 1, wherein the control unit changes a frequency of a clock signal supplied to the driving unit, in accordance with the scanning speed of the deflecting unit.

5. The optical scanning device according to claim 1, wherein the number of light beams is 32, 36, or 40.

6. The optical scanning device according to claim 1, wherein the light intensity is 0.200 mW or 0.205 mW.

7. An optical scanning device control method comprising:

driving a light source that outputs light beams, wherein the driving of the light source has a first mode in which a first set of a first predetermined number of adjacent light beams is driven by a single piece of data, and a second mode in which a second set of a second predetermined number of adjacent light beams is driven by a single piece of data;

scanning a scanning surface in a main-scanning direction by deflecting the light beams, the scanning surface moving at a predetermined line speed in a sub-scanning direction; and controlling including:

changing a number of the light beams according to the predetermined line speed by controlling the driving of the light source, changing a scanning speed by the deflecting in the main-scanning direction according to a difference between an exposure amount per unit length in the main-scanning direction after a change in the number of the light beams and a predetermined exposure amount, changing light intensity of each of the light beams output by the light source according to an amount of the change in the scanning speed, and changing the number of the light beams in units of a greater number of the light beams between a number of the light beams of the first set and a number of the light beams of the second set.

8. The optical scanning device control method according to claim 7, further comprising:

driving the first set of the first predetermined number of adjacent light beams or the second set of the second predetermined number of adjacent light beams.

9. The optical scanning device control method according to claim 7, further comprising:

changing the number of the light beams such that a change in the exposure amount due to the change in the number of the light beams is greater than a change in the exposure amount due to the change in the scanning speed of the deflecting.

10. The optical scanning device control method according to claim 7, further comprising:

changing a frequency of a clock signal supplied to the driving of the light source, in accordance with the scanning speed of the deflecting.

11. An image forming apparatus comprising:

a light source that simultaneously outputs light beams;

a driving unit that drives the light source;

a deflecting unit that deflects the light beams;

a photosensitive drum that rotates about a rotation axis at a predetermined line speed in a sub-scanning direction and that is scanned and exposed in a main-scanning direction with the light beams deflected by the deflecting unit;

a control unit that changes a number of the light beams according to the predetermined line speed by controlling the driving unit, changes a scanning speed of the deflecting unit in the main-scanning direction according to a difference between an exposure amount per unit length in the main-scanning direction after a change in the number of the light beams and a predetermined exposure amount, and changes light intensity of each of the light beams output by the light source according to a change in the scanning speed; and an image forming unit that forms an image by the photosensitive drum, wherein the driving unit has a first mode in which a first set of a first predetermined number of adjacent light beams is driven by a single piece of data, and a second mode in which a second set of a second predetermined number of adjacent light beams is driven by a single piece of data, and the control unit changes the number of the light beams in units of a greater number of the light beams between a number of the light beams of the first set and a number of the light beams of the second set.

12. An optical scanning device comprising:

a driving unit that drives a light source that outputs light beams;

a deflecting unit that scans a scanning surface in a main-scanning direction by deflecting the light beams, the scanning surface moving at a predetermined line speed in a sub-scanning direction; and a control unit that changes a number of the light beams according to the predetermined line speed by controlling the driving unit, changes a scanning speed of the deflecting unit in the main-scanning direction according to a difference between an exposure amount per unit length in the main-scanning direction after a change in the number of the light beams and a predetermined exposure amount, and changes light intensity of each of the light beams output by the light source according to an amount of a change in the scanning speed, wherein the control unit changes the number of the light beams such that a change in the exposure amount due to the change in the number of the light beams is greater than a change in the exposure amount due to the change in the scanning speed of the deflecting unit.

13. The optical scanning device according to claim 12, wherein the driving unit drives a set of a predetermined number of adjacent light beams by a single piece of data.

14. The optical scanning device according to claim 13, wherein the control unit changes the number of the light beams in units of the predetermined number of the light beams.

15. The optical scanning device according to claim 14, wherein the control unit changes a frequency of a clock signal supplied to the driving unit, in accordance with the scanning speed of the deflecting unit.

16. The optical scanning device according to claim 13, wherein the control unit changes a frequency of a clock signal supplied to the driving unit, in accordance with the scanning speed of the deflecting unit.

17. The optical scanning device according to claim 12, wherein the control unit changes a frequency of a clock signal supplied to the driving unit, in accordance with the scanning speed of the deflecting unit.

18. The optical scanning device according to claim 12, wherein the driving unit drives the first set of the first predetermined number of adjacent light beams or the second set of the second predetermined number of adjacent light beams.

19. The optical scanning device according to claim 12, wherein the control unit changes the number of the light beams such that a change in the exposure amount due to the change in the number of the light beams is greater than a change in the exposure amount due to the change in the scanning speed of the deflecting unit.

20. The optical scanning device according to claim 12, wherein the control unit changes a frequency of a clock signal supplied to the driving unit, in accordance with the scanning speed of the deflecting unit.

* * * * *